US012599176B2

(12) United States Patent
Davis et al.

(10) Patent No.: US 12,599,176 B2
(45) Date of Patent: Apr. 14, 2026

(54) AEROSOL DELIVERY DEVICE INCLUDING A WIRELESSLY-HEATED ATOMIZER AND RELATED METHOD

(71) Applicant: RAI Strategic Holdings, Inc., Winston-Salem, NC (US)

(72) Inventors: Michael F. Davis, Clemmons, NC (US); Stephen Benson Sears, Siler City, NC (US); Carolyn Rierson Carpenter, Lewisville, NC (US); Melissa Ann Clark, Mocksville, NC (US); Shierina A. Fareed, Winston-Salem, NC (US); Denise Fox, Winston-Salem, NC (US); Tao Jin, Clemmons, NC (US); Percy D. Phillips, Pfafftown, NC (US); Alfred Charles Bless, Asheboro, NC (US); Karen V. Taluskie, Winston-Salem, NC (US); Brian Keith Nordskog, Winston-Salem, NC (US); David T. Szabo, Durham, NC (US); Josef Strasser, Jr., Greensboro, NC (US)

(73) Assignee: RAI Strategic Holdings, Inc., Winston-Salem, NC (US)

( * ) Notice: Subject to any disclaimer, the term of this patent is extended or adjusted under 35 U.S.C. 154(b) by 0 days.

(21) Appl. No.: 18/661,347

(22) Filed: May 10, 2024

(65) Prior Publication Data

US 2024/0298707 A1 Sep. 12, 2024

Related U.S. Application Data

(63) Continuation of application No. 17/072,669, filed on Oct. 16, 2020, now Pat. No. 12,011,043, which is a (Continued)

(51) Int. Cl.

*A24F 40/465* (2020.01)
*A24F 40/10* (2020.01)

(Continued)

(52) U.S. Cl.

CPC ............ *A24F 40/465* (2020.01); *A24F 40/50* (2020.01); *A24F 40/95* (2020.01); *H05B 6/108* (2013.01); *A24F 40/10* (2020.01)

(58) Field of Classification Search

CPC .......... H05B 6/108; A24F 40/10; A24F 40/42; A24F 40/465; A24F 40/50

See application file for complete search history.

(56) References Cited

U.S. PATENT DOCUMENTS

| | | | |
|---|---|---|---|
| 1,771,366 | A | 7/1930 | Wyss et al. |
| 2,057,353 | A | 10/1936 | Whittemore, Jr. |

(Continued)

FOREIGN PATENT DOCUMENTS

| | | |
|---|---|---|
| AU | 276250 | 7/1965 |
| CA | 2 641 869 | 5/2010 |

(Continued)

OTHER PUBLICATIONS

Wikipedia; Electromagnetic Induction (5 pgs.) Website visited Nov. 9, 2015 https:--en.wikipedia.org-wiki-Electromagnetic_induction.

(Continued)

*Primary Examiner* — Brian W Jennison

(74) *Attorney, Agent, or Firm* — Womble Bond Dickinson (US) LLP

(57) ABSTRACT

An aerosol delivery device includes an electrical power source, an induction receiver configured to receive a substrate including an aerosol precursor composition such that the induction receiver is in proximity to the substrate, and a wireless power transmitter including an induction transmitter. The induction transmitter is configured to removably (Continued)

receive the induction receiver such that the induction transmitter surrounds the induction receiver. The induction transmitter receive electrical current from the electrical power source that causes the induction transmitter to generate an oscillating magnetic field, and the induction receiver generates heat via eddy currents induced at the induction receiver when exposed to the oscillating magnetic field and thereby heats the aerosol precursor composition to produce an aerosol. Related methods are also provided.

34 Claims, 13 Drawing Sheets

Related U.S. Application Data continuation of application No. 14/934,763, filed on Nov. 6, 2015, now Pat. No. 10,820,630.

(51) Int. Cl.

| | |
|---|---|
| ***A24F 40/50*** | (2020.01) |
| ***A24F 40/95*** | (2020.01) |
| ***H05B 6/10*** | (2006.01) |

(56) References Cited

U.S. PATENT DOCUMENTS 2,104,266 A 1/1938 McCormick
3,200,819 A 8/1965 Gilbert
4,284,089 A 8/1981 Ray
4,303,083 A 12/1981 Burruss, Jr.
4,735,217 A 4/1988 Gerth et al.
4,848,374 A 7/1989 Chard et al.
4,907,606 A 3/1990 Lilja et al.
4,922,901 A 5/1990 Brooks et al.
4,945,931 A 8/1990 Gori
4,947,874 A 8/1990 Brooks et al.
4,947,875 A 8/1990 Brooks et al.
4,986,286 A 1/1991 Roberts et al.
5,019,122 A 5/1991 Clearman et al.
5,042,510 A 8/1991 Curtiss et al.
5,060,671 A 10/1991 Counts et al.
5,093,894 A 3/1992 Deevi et al.
5,144,962 A 9/1992 Counts et al.
5,180,949 A 1/1993 Durr
5,223,264 A 6/1993 Wehling et al.
5,249,586 A 10/1993 Morgan et al.
5,261,424 A 11/1993 Sprinkel, Jr.
5,322,075 A 6/1994 Deevi et al.
5,353,813 A 10/1994 Deevi et al.
5,369,723 A 11/1994 Counts et al.
5,372,148 A 12/1994 McCafferty et al.
5,388,574 A 2/1995 Ingebrethsen et al.
5,408,574 A 4/1995 Deevi et al.
5,468,936 A 11/1995 Deevi et al.
5,498,850 A 3/1996 Das
5,515,842 A 5/1996 Ramseyer et al.
5,530,225 A 6/1996 Hajaligol
5,564,442 A 10/1996 MacDonald et al.
5,613,505 A 3/1997 Campbell et al.
5,649,554 A 7/1997 Sprinkel et al.
5,666,977 A 9/1997 Higgins et al.
5,687,746 A 11/1997 Rose et al.
5,726,421 A 3/1998 Fleischhauer et al.
5,727,571 A 3/1998 Meiring et al.
5,743,251 A 4/1998 Howell et al.
5,799,663 A 9/1998 Gross et al.
5,819,756 A 10/1998 Mielordt
5,865,185 A 2/1999 Collins et al.
5,865,186 A 2/1999 Volsey, II
5,878,752 A 3/1999 Adams et al.
5,894,841 A 4/1999 Voges
5,934,289 A 8/1999 Watkins et al.
5,954,979 A 9/1999 Counts et al.
5,967,148 A 10/1999 Harris et al.
6,040,560 A 3/2000 Fleischhauer et al.
6,053,176 A 4/2000 Adams et al.
6,089,857 A 7/2000 Matsuura et al.
6,095,153 A 8/2000 Kessler et al.
6,125,853 A 10/2000 Susa et al.
6,155,268 A 12/2000 Takeuchi
6,164,287 A 12/2000 White
6,196,218 B1 3/2001 Voges
6,196,219 B1 3/2001 Hess et al.
6,598,607 B2 7/2003 Adiga et al.
6,601,776 B1 8/2003 Oljaca et al.
6,615,840 B1 9/2003 Fournier et al.
6,688,313 B2 2/2004 Wrenn et al.
6,772,756 B2 8/2004 Shayan
6,803,545 B2 10/2004 Blake et al.
6,803,550 B2 10/2004 Sharpe et al.
6,854,461 B2 2/2005 Nichols
6,854,470 B1 2/2005 Pu
7,117,867 B2 10/2006 Cox et al.
7,185,659 B2 3/2007 Sharpe
7,293,565 B2 11/2007 Griffin et al.
7,513,253 B2 4/2009 Kobayashi et al.
7,775,459 B2 8/2010 Martens, III et al.
7,832,410 B2 11/2010 Hon
7,845,359 B2 12/2010 Montaser
7,896,006 B2 3/2011 Hamano et al.
8,127,772 B2 3/2012 Montaser
8,314,591 B2 11/2012 Terry et al.
8,365,742 B2 2/2013 Hon
8,402,976 B2 3/2013 Fernando et al.
8,499,766 B1 8/2013 Newton
8,528,569 B1 9/2013 Newton
8,550,069 B2 10/2013 Alelov
2002/0078956 A1 6/2002 Sharpe et al.
2002/0146242 A1 10/2002 Vieira
2003/0226837 A1 12/2003 Blake et al.
2004/0118401 A1 6/2004 Smith et al.
2004/0129280 A1 7/2004 Woodson et al.
2004/0149737 A1 8/2004 Sharpe et al.
2004/0200488 A1 10/2004 Felter et al.
2004/0226568 A1 11/2004 Takeuchi et al.
2005/0016550 A1 1/2005 Katase
2005/0253160 A1 11/2005 Strikovski et al.
2006/0016453 A1 1/2006 Kim
2006/0196518 A1 9/2006 Hon
2007/0074734 A1 4/2007 Braunshteyn et al.
2007/0102013 A1 5/2007 Adams et al.
2007/0215167 A1 9/2007 Crooks et al.
2008/0085103 A1 4/2008 Beland et al.
2008/0092912 A1 4/2008 Robinson et al.
2008/0257367 A1 10/2008 Paterno et al.
2008/0276947 A1 11/2008 Martzel
2008/0302374 A1 12/2008 Wengert et al.
2009/0095311 A1 4/2009 Hon
2009/0095312 A1 4/2009 Herbrich et al.
2009/0126745 A1 5/2009 Hon
2009/0188490 A1 7/2009 Hon
2009/0230117 A1 9/2009 Fernando et al.
2009/0272379 A1 11/2009 Thorens et al.
2009/0283103 A1 11/2009 Nielsen et al.
2009/0320863 A1 12/2009 Fernando et al.
2010/0043809 A1 2/2010 Magnon
2010/0083959 A1 4/2010 Siller
2010/0200006 A1 8/2010 Robinson et al.
2010/0229881 A1 9/2010 Hearn
2010/0242974 A1 9/2010 Pan
2010/0307518 A1 12/2010 Wang
2010/0313901 A1 12/2010 Fernando et al.
2011/0005535 A1 1/2011 Xiu
2011/0011396 A1 1/2011 Fang
2011/0036363 A1 2/2011 Urtsev et al.
2011/0036365 A1 2/2011 Chong et al.
2011/0094523 A1 4/2011 Thorens et al.
2011/0126848 A1 6/2011 Zuber et al.
2011/0155153 A1 6/2011 Thorens et al.
2011/0155718 A1 6/2011 Greim et al.
2011/0168194 A1 7/2011 Hon
2011/0265806 A1 11/2011 Alarcon et al.

(56) References Cited

U.S. PATENT DOCUMENTS

| | | | |
|---|---|---|---|
| 2011/0309157 | A1 | 12/2011 | Yang et al. |
| 2012/0042885 | A1 | 2/2012 | Stone et al. |
| 2012/0060853 | A1 | 3/2012 | Robinson et al. |
| 2012/0111347 | A1 | 5/2012 | Hon |
| 2012/0132643 | A1 | 5/2012 | Choi et al. |
| 2012/0227752 | A1 | 9/2012 | Alelov |
| 2012/0231464 | A1 | 9/2012 | Yu et al. |
| 2012/0260927 | A1 | 10/2012 | Liu |
| 2012/0279512 | A1 | 11/2012 | Hon |
| 2012/0318882 | A1 | 12/2012 | Abehasera |
| 2013/0008457 | A1 | 1/2013 | Zheng et al. |
| 2013/0037041 | A1 | 2/2013 | Worm et al. |
| 2013/0056013 | A1 | 3/2013 | Terry et al. |
| 2013/0081625 | A1 | 4/2013 | Rustad et al. |
| 2013/0081642 | A1 | 4/2013 | Safari |
| 2013/0192619 | A1 | 8/2013 | Tucker et al. |
| 2013/0255702 | A1 | 10/2013 | Griffith, Jr. et al. |
| 2013/0306084 | A1 | 11/2013 | Flick |
| 2013/0319439 | A1 | 12/2013 | Gorelick et al. |
| 2013/0340750 | A1 | 12/2013 | Thorens et al. |
| 2013/0340775 | A1 | 12/2013 | Juster et al. |
| 2014/0000638 | A1 | 1/2014 | Sebastian et al. |
| 2014/0060554 | A1 | 3/2014 | Collett et al. |
| 2014/0060555 | A1 | 3/2014 | Chang et al. |
| 2014/0096781 | A1 | 4/2014 | Sears et al. |
| 2014/0096782 | A1 | 4/2014 | Ampolini et al. |
| 2014/0109921 | A1 | 4/2014 | Chen |
| 2014/0157583 | A1 | 6/2014 | Ward et al. |
| 2014/0209105 | A1 | 7/2014 | Sears et al. |
| 2014/0253144 | A1 | 9/2014 | Novak et al. |
| 2014/0261408 | A1 | 9/2014 | DePiano et al. |
| 2014/0261486 | A1 | 9/2014 | Potter et al. |
| 2014/0261487 | A1 | 9/2014 | Chapman et al. |
| 2014/0261495 | A1 | 9/2014 | Novak et al. |
| 2014/0270727 | A1 | 9/2014 | Ampolini et al. |
| 2014/0270729 | A1 | 9/2014 | DePiano et al. |
| 2014/0270730 | A1 | 9/2014 | DePiano et al. |
| 2014/0345631 | A1 | 11/2014 | Bowen et al. |
| 2015/0053217 | A1 | 2/2015 | Steingraber et al. |
| 2015/0216232 | A1 | 8/2015 | Bless et al. |
| 2015/0245669 | A1* | 9/2015 | Cadieux .................. A24F 40/44 131/329 |
| 2015/0282525 | A1 | 10/2015 | Plojoux et al. |
| 2015/0320116 | A1 | 11/2015 | Bleloch et al. |
| 2016/0150828 | A1 | 6/2016 | Goldstein et al. |

FOREIGN PATENT DOCUMENTS

| | | | |
|---|---|---|---|
| CA | 2946480 | | 11/2015 |
| CN | 1541577 | | 11/2004 |
| CN | 2719043 | | 8/2005 |
| CN | 200997909 | | 1/2008 |
| CN | 101116542 | | 2/2008 |
| CN | 101176805 | | 5/2008 |
| CN | 201379072 | | 1/2010 |
| CN | 103431524 | | 12/2013 |
| CN | 103889258 | A | 6/2014 |
| CN | 203660013 | U | 6/2014 |
| CN | 103945716 | A | 7/2014 |
| CN | 104066345 | | 9/2014 |
| CN | 104095295 | | 10/2014 |
| CN | 104382238 | A | 3/2015 |
| CN | 104382239 | A | 3/2015 |
| CN | 204292204 | | 4/2015 |
| CN | 204519365 | U | 8/2015 |
| CN | 204599333 | | 9/2015 |
| DE | 10 2006 004 484 | | 8/2007 |
| DE | 102006041042 | | 3/2008 |
| DE | 20 2009 010 400 | | 11/2009 |
| EA | 006333 | B1 | 12/2005 |
| EP | 0 295 122 | | 12/1988 |
| EP | 0 430 566 | | 6/1991 |
| EP | 0 845 220 | | 6/1998 |
| EP | 1 618 803 | | 1/2006 |
| EP | 2 100 525 | A1 | 9/2009 |
| EP | 2 316 286 | | 5/2011 |
| EP | 2444112 | | 4/2012 |
| GB | 2067415 | | 7/1981 |
| GB | 2469850 | | 11/2010 |
| JP | 2003001693 | A | 1/2003 |
| KZ | 28017 | B | 12/2013 |
| RU | 103281 | | 4/2011 |
| RU | 2564611 | C1 | 10/2015 |
| WO | WO 1997/48293 | | 12/1997 |
| WO | WO 2003/034847 | | 5/2003 |
| WO | WO 2004/043175 | | 5/2004 |
| WO | WO 2004/080216 | | 9/2004 |
| WO | WO 2005/099494 | | 10/2005 |
| WO | WO 2007/078273 | | 7/2007 |
| WO | WO 2007/131449 | | 11/2007 |
| WO | WO 2009/105919 | | 9/2009 |
| WO | WO 2009/155734 | | 12/2009 |
| WO | WO 2010/003480 | | 1/2010 |
| WO | WO 2010/045670 | | 4/2010 |
| WO | WO 2010/073122 | | 7/2010 |
| WO | WO 2010/118644 | | 10/2010 |
| WO | WO 2010/140937 | | 12/2010 |
| WO | WO 2011/010334 | | 1/2011 |
| WO | WO 2012/072762 | | 6/2012 |
| WO | WO 2012/100523 | | 8/2012 |
| WO | WO 2013/089551 | | 6/2013 |
| WO | WO2014048745 | | 4/2014 |
| WO | WO2014138244 | | 9/2014 |
| WO | WO2014150247 | | 9/2014 |
| WO | WO2014201666 | | 12/2014 |
| WO | WO2015176898 | | 11/2015 |
| WO | WO2015177043 | | 11/2015 |
| WO | WO2015177044 | | 11/2015 |
| WO | WO2015177045 | | 11/2015 |
| WO | WO2015177046 | | 11/2015 |
| WO | WO2015177252 | | 11/2015 |
| WO | WO2015177253 | | 11/2015 |
| WO | WO2015177254 | | 11/2015 |
| WO | WO2015177255 | | 11/2015 |
| WO | WO2015177256 | | 11/2015 |
| WO | WO2015177257 | | 11/2015 |
| WO | WO2015177263 | | 11/2015 |
| WO | WO2015177264 | | 11/2015 |
| WO | WO2015177265 | | 11/2015 |
| WO | WO2015177294 | | 11/2015 |
| WO | WO 2015/192357 | | 12/2015 |
| WO | WO2016075436 | | 5/2016 |

OTHER PUBLICATIONS

Wikipedia; Joule Heating (7 pages) Website visited Nov. 9, 2015 https:--en.wikipedia.org-wiki-Joule_heating.

European Search Report dated May 15, 2020 from the corresponding European Patent Application No. 20155878.

International Search Report dated May 24, 2017 for International Application No. PCT-IB2014-050293.

International Search Report issued Feb. 3, 2017 in International Patent Application No. PCT-IB2016-056657 filed Nov. 4, 2016.

Sokal, N.O., "Class-E RF Power Amplifiers," Jan.-Feb. 2001.

Office Action issued Dec. 14, 2023, in corresponding Chinese application No. 202110665080.2.

Office Action issued Dec. 21, 2023, in corresponding Chinese application No. 202110665398.0.

Suwen Gong et al., Power Electronics Technology 2nd Edition, Published Mar. 31, 2014, Beijing Institute of Technology Press, p. 171.

* cited by examiner

AEROSOL DELIVERY DEVICE INCLUDING A WIRELESSLY-HEATED ATOMIZER AND RELATED METHOD

CROSS-REFERENCE TO RELATED APPLICATIONS

This application is a Continuation of U.S. patent application Ser. No. 17/072,669, filed Oct. 16, 2020, which is a Continuation of U.S. patent application Ser. No. 14/934,763, filed Nov. 6, 2015, now U.S. Pat. No. 10,820,630, the contents of which are hereby incorporated by reference.

BACKGROUND

Field of the Disclosure

The present disclosure relates to aerosol delivery devices such as electronic cigarettes and heat-not-burn cigarettes, and more particularly to an aerosol delivery device including a wirelessly-heated atomizer. The atomizer may be configured to heat an aerosol precursor composition, which may be made or derived from tobacco or otherwise incorporate tobacco, to form an inhalable substance for human consumption.

Description of Related Art

Many smoking devices have been proposed through the years as improvements upon, or alternatives to, smoking products that require combusting tobacco for use. Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 8,881,737 to Collett et al., U.S. Pat. App. Pub. No. 2013/0255702 to Griffith Jr. et al., U.S. Pat. App. Pub. No. 2014/0000638 to Sebastian et al., U.S. Pat. App. Pub. No. 2014/0096781 to Sears et al., U.S. Pat. App. Pub. No. 2014/0096782 to Ampolini et al., and U.S. Pat. App. Pub. No. 2015/0059780 to Davis et al., which are incorporated herein by reference in their entireties. See also, for example, the various embodiments of products and heating configurations described in the background sections of U.S. Pat. No. 5,388,594 to Counts et al. and U.S. Pat. No. 8,079,371 to Robinson et al., which are incorporated by reference in their entireties.

Various embodiments of aerosol delivery devices employ an atomizer to produce an aerosol from an aerosol precursor composition. Such atomizers often employ direct resistive heating to produce heat. In this regard, atomizers may include a heating element comprising a coil or other member that produces heat via the electrical resistance associated with the material through which an electrical current is directed. Electrical current is typically directed through the heating element via direct electrical connections such as wires or connectors. However, forming such electrical connections may complicate assembly of the aerosol delivery device and add potential points of failure. Further, in some embodiments the aerosol delivery device may include a control body, which may include an electrical power source, and a cartridge, which may include the atomizer. In these embodiments electrical connections between the cartridge and the control body may be required, which may further complicate the design of the aerosol delivery device. Thus, advances with respect to aerosol delivery devices may be desirable.

BRIEF SUMMARY OF THE DISCLOSURE

The present disclosure relates to aerosol delivery devices configured to produce aerosol and which aerosol delivery devices, in some embodiments, may be referred to as electronic cigarettes or heat-not-burn cigarettes. As described hereinafter, the aerosol delivery devices may include an induction receiver and an induction transmitter, which may cooperate to form an electrical transformer. The induction transmitter may include a coil configured to create an oscillating magnetic field (e.g., a magnetic field that varies periodically with time) when alternating current is directed therethrough. The induction receiver may be at least partially received within the induction transmitter and may include a conductive material. Thereby, by directing alternating current through the induction transmitter, eddy currents may be generated in the induction receiver via induction. The eddy currents flowing through the resistance of the material defining the induction receiver may heat it by Joule heating. Thereby, the induction receiver, which may define an atomizer, may be wirelessly heated to form an aerosol from an aerosol precursor composition positioned in proximity to the induction receiver. Wireless heating, as used herein, refers to heating that occurs via an atomizer that is not physically electrically connected to the electrical power source.

In one aspect, an aerosol delivery device includes an electrical power source, an induction receiver configured to receive a substrate including an aerosol precursor composition such that the induction receiver is in proximity to the substrate, and a wireless power transmitter including an induction transmitter. The induction transmitter is configured to removably receive the induction receiver such that the induction transmitter surrounds the induction receiver. The induction transmitter is configured to receive electrical current from the electrical power source that causes the induction transmitter to generate an oscillating magnetic field. The induction receiver is configured to generate heat via eddy currents induced at the induction receiver when exposed to the oscillating magnetic field and thereby heat the aerosol precursor composition to produce an aerosol.

The present disclosure thus includes, without limitation, the following example embodiments:

Example Embodiment 1: An aerosol delivery device, comprising an electrical power source; an induction receiver configured to receive a substrate including an aerosol precursor composition such that the induction receiver is in proximity to the substrate; and a wireless power transmitter including an induction transmitter, the induction transmitter being configured to removably receive the induction receiver such that the induction transmitter surrounds the induction receiver, the induction transmitter configured to receive electrical current from the electrical power source that causes the induction transmitter to generate an oscillating magnetic field, and the induction receiver configured to generate heat via eddy currents induced at the induction receiver when exposed to the oscillating magnetic field and thereby heat the aerosol precursor composition to produce an aerosol.

Example Embodiment 2: The aerosol delivery device of any preceding example embodiment, or combinations thereof, wherein the induction receiver is in contact with the substrate.

Example Embodiment 3: The aerosol delivery device of any preceding example embodiment, or combinations thereof, wherein the aerosol precursor composition comprises a solid tobacco material or a semi-solid tobacco material.

Example Embodiment 4: The aerosol delivery device of any preceding example embodiment, or combinations thereof, wherein the induction receiver is surrounding but out of direct contact with the substrate.

Example Embodiment 5: The aerosol delivery device of any preceding example embodiment, or combinations thereof, wherein the induction transmitter is surrounding but out of direct contact with the induction receiver.

Example Embodiment 6: The aerosol delivery device of any preceding example embodiment, or combinations thereof, comprising a pocket defined by a container or body of the aerosol delivery device or a component engaged with the container or body, the pocket being configured to receive the substrate.

Example Embodiment 7: The aerosol delivery device of any preceding example embodiment, or combinations thereof, wherein the induction receiver is in proximity to or in contact with the substrate received by the pocket, and wherein the induction transmitter is configured to surround the pocket having the induction receiver and the substrate received therein.

Example Embodiment 8: The aerosol delivery device of any preceding example embodiment, or combinations thereof, wherein the induction transmitter is removably attached to the aerosol delivery device.

Example Embodiment 9: The aerosol delivery device of any preceding example embodiment, or combinations thereof, wherein the induction receiver is porous to allow the aerosol to freely pass through the induction receiver.

Example Embodiment 10: The aerosol delivery device of any preceding example embodiment, or combinations thereof, wherein the induction receiver is a mesh, a screen, a helix or a braid.

Example Embodiment 11: The aerosol delivery device of any preceding example embodiment, or combinations thereof, wherein the induction transmitter defines a tubular configuration or a coiled configuration.

Example Embodiment 12: The aerosol delivery device of any preceding example embodiment, or combinations thereof, comprising a control body including the electrical power source and the induction transmitter, and a cartridge including the induction receiver and the substrate.

Example Embodiment 13: The aerosol delivery device of any preceding example embodiment, or combinations thereof, wherein the control body further comprises an outer body, a controller, a flow sensor, and an indicator.

Example Embodiment 14: The aerosol delivery device of any preceding example embodiment, or combinations thereof, wherein the aerosol precursor composition includes a solid tobacco material or a semi-solid tobacco material.

Example Embodiment 15: The aerosol delivery device of any preceding example embodiment, or combinations thereof, wherein the aerosol precursor composition includes a liquid aerosol precursor composition.

Example Embodiment 16: The aerosol delivery device of any preceding example embodiment, or combinations thereof, further comprising a container and a sealing member that define an internal compartment for the liquid aerosol precursor composition, the container defining a pocket configured to receive the substrate, and the sealing member defining an aperture through which the substrate is extended to receive the liquid aerosol precursor composition from the internal compartment.

Example Embodiment 17: A method for assembling an aerosol delivery device, comprising providing an induction receiver configured to receive a substrate including an aerosol precursor composition such that the induction receiver is in proximity to the substrate; providing a wireless power transmitter including an induction transmitter configured to removably receive the induction receiver; and positioning the induction transmitter such that the induction transmitter surrounds the induction receiver, the induction transmitter configured to receive electrical current from an electrical power source that causes the induction transmitter to generate an oscillating magnetic field, and the induction receiver configured to generate heat via eddy currents induced at the induction receiver when exposed to the oscillating magnetic field and thereby heat the aerosol precursor composition to produce an aerosol.

Example Embodiment 18: The method of any preceding example embodiment, or combinations thereof, wherein providing the induction receiver comprises providing the induction receiver configured to receive the substrate such that the induction receiver in contact with the substrate.

Example Embodiment 19: The method of any preceding example embodiment, or combinations thereof, wherein providing the induction receiver comprises providing the induction receiver configured to receive the substrate with the aerosol precursor composition of the substrate comprising a solid tobacco material or a semi-solid tobacco material.

Example Embodiment 20: The method of any preceding example embodiment, or combinations thereof, wherein providing the induction receiver comprises providing the induction receiver configured to receive the substrate such that the induction receiver surrounds but is out of direct contact with the substrate.

Example Embodiment 21: The method of any preceding example embodiment, or combinations thereof, wherein providing the wireless power transmitter comprises providing the wireless power transmitter configured such that the induction transmitter removably receiving the induction receiver surrounds but is out of direct contact with the induction receiver.

Example Embodiment 22: The method of any preceding example embodiment, or combinations thereof, comprising providing a pocket defined by a container or body of the aerosol delivery device or a component engaged with the container or body, the pocket being configured to receive the substrate.

Example Embodiment 23: The method of any preceding example embodiment, or combinations thereof, wherein providing the induction receiver comprises providing the induction receiver in proximity to or in contact with the substrate received by the pocket, and wherein providing the wireless power transmitter comprises providing the wireless power transmitter such that the induction transmitter surrounds the pocket having the induction receiver and the substrate therein.

Example Embodiment 24: The method of any preceding example embodiment, or combinations thereof, wherein the induction transmitter is positioned surrounding but out of direct contact with the induction receiver to thereby assemble the aerosol delivery device in which the induction transmitter is removably attached to the aerosol delivery device.

Example Embodiment 25: The method of any preceding example embodiment, or combinations thereof, wherein providing the induction receiver includes providing the induction receiver that is porous to allow the aerosol to freely pass through the induction receiver.

Example Embodiment 26: The method of any preceding example embodiment, or combinations thereof, wherein providing the induction receiver includes providing the induction receiver that is a mesh, a screen, a helix or a braid.

Example Embodiment 27: The method of any preceding example embodiment, or combinations thereof, comprising positioning the substrate inside the induction receiver.

Example Embodiment 28: The method of any preceding example embodiment, or combinations thereof, wherein positioning the substrate includes positioning the substrate in which the aerosol precursor composition includes a solid tobacco material or a semi-solid tobacco material.

Example Embodiment 29: The method of any preceding example embodiment, or combinations thereof, wherein positioning the substrate includes positioning the substrate in which the aerosol precursor composition includes a liquid aerosol precursor composition.

Example Embodiment 30: The method of any preceding example embodiment, or combinations thereof, comprising:

- providing a container and a sealing member that define an internal compartment for the liquid aerosol precursor composition, the container defining a pocket in which the substrate is received;
- filling the internal compartment with the liquid aerosol precursor composition; and
- extending the substrate through an aperture defined through the sealing member to receive the liquid aerosol precursor composition from the internal compartment.

Example Embodiment 31: The method of any preceding example embodiment, or combinations thereof, comprising forming a cartridge including the substrate and the induction receiver.

Example Embodiment 32: The method of any preceding example embodiment, or combinations thereof, comprising forming a control body including coupling the electrical power source to the induction transmitter.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE FIGURES

Figure 1:
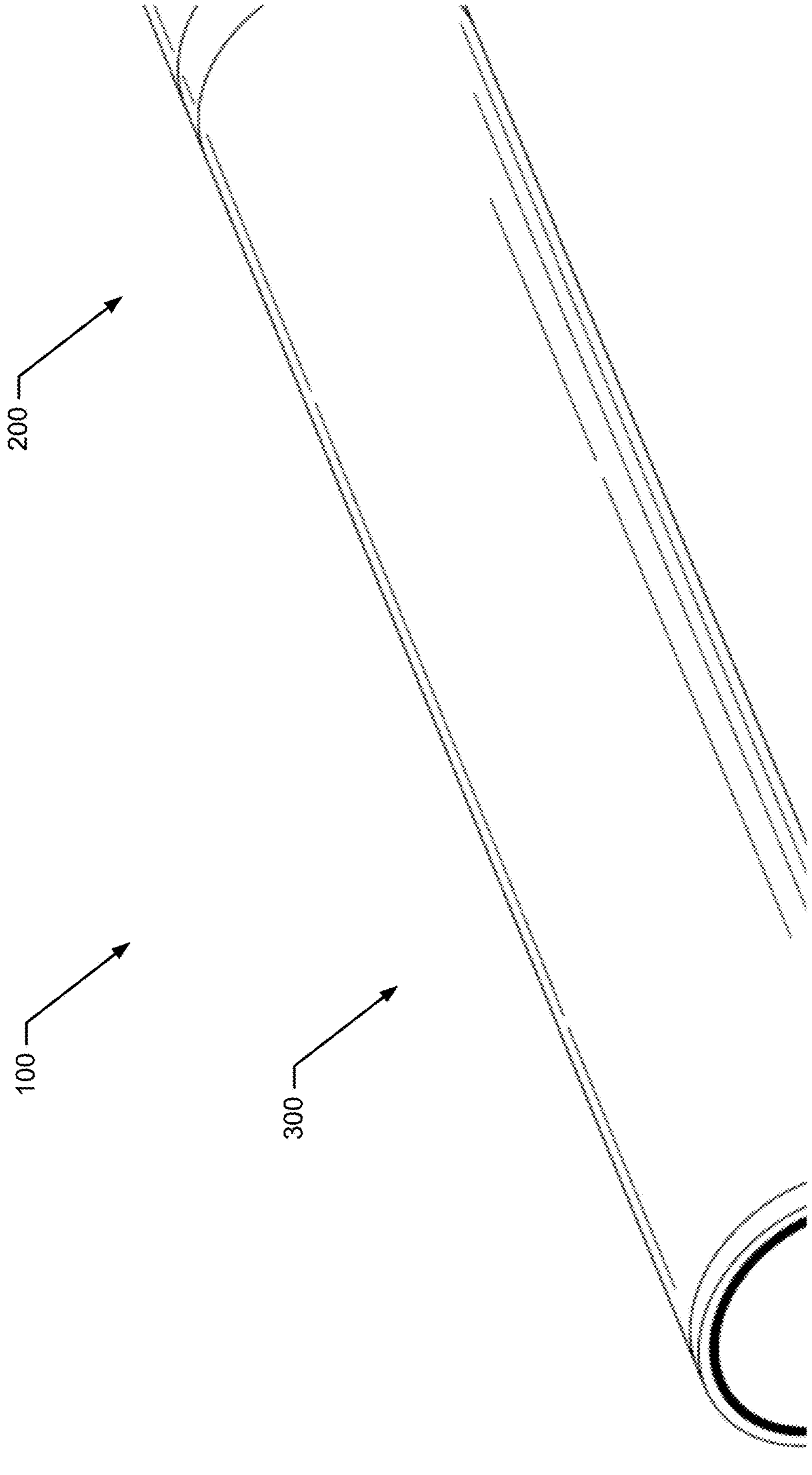
Figure 2:
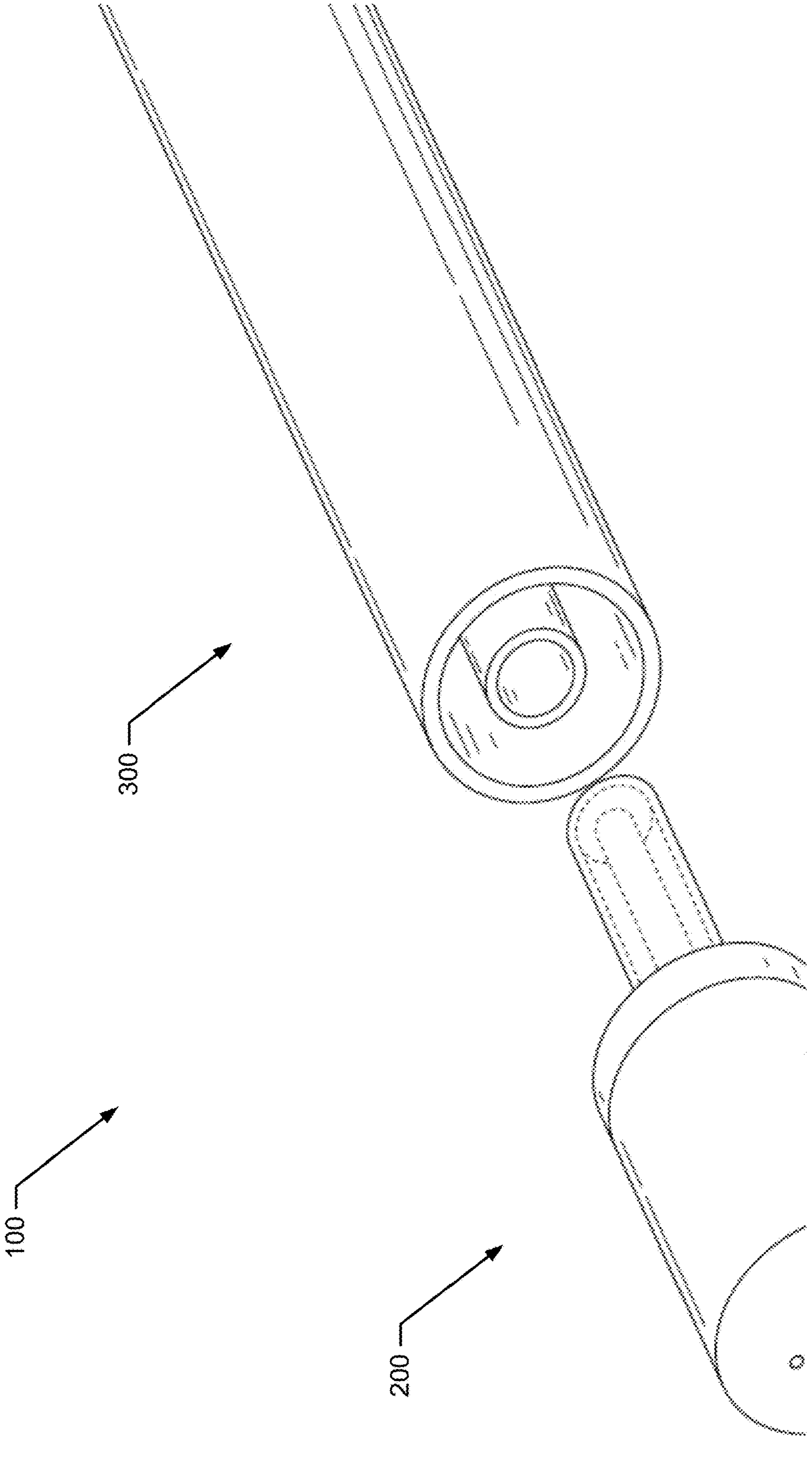
Figure 3:
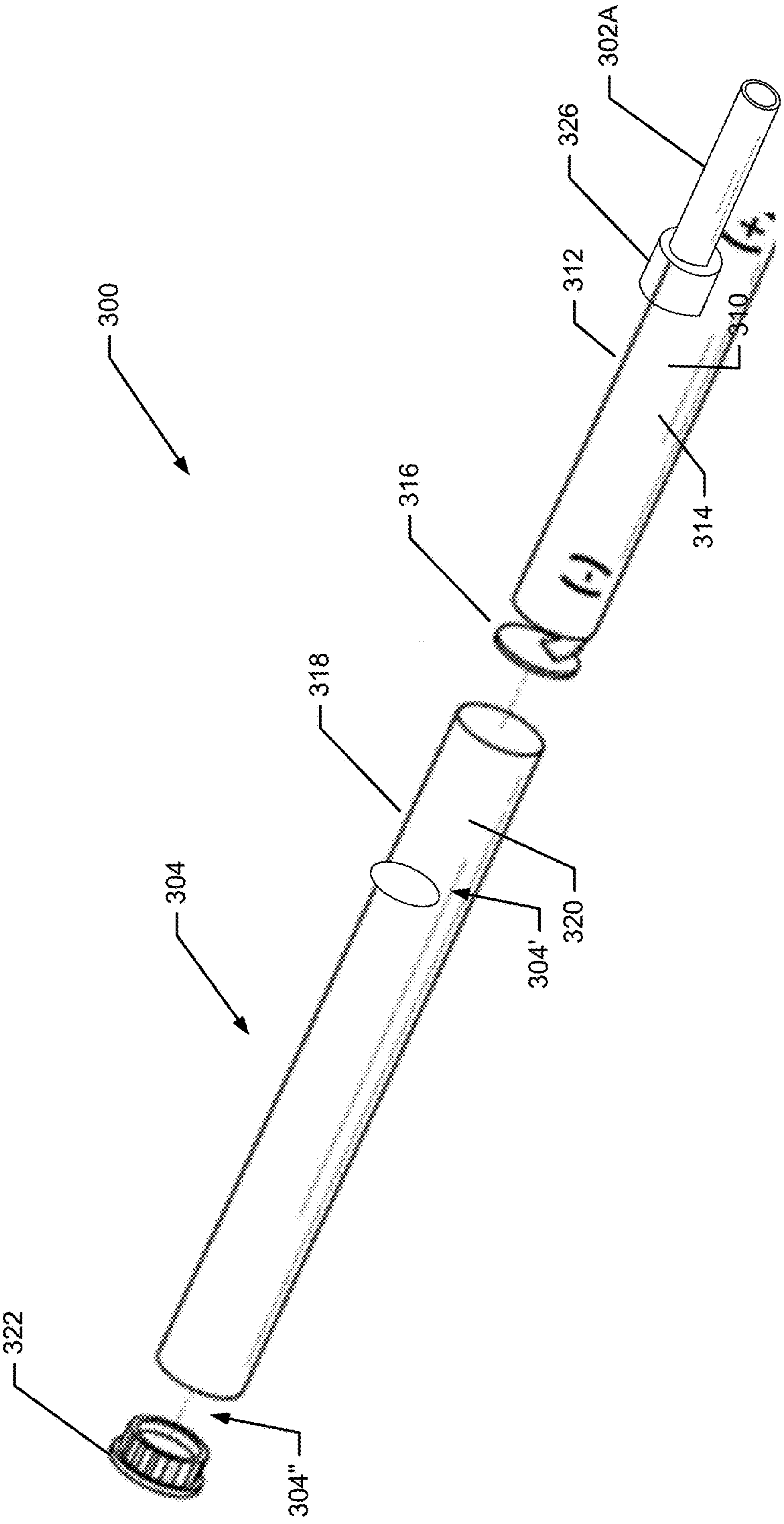
Figure 4:
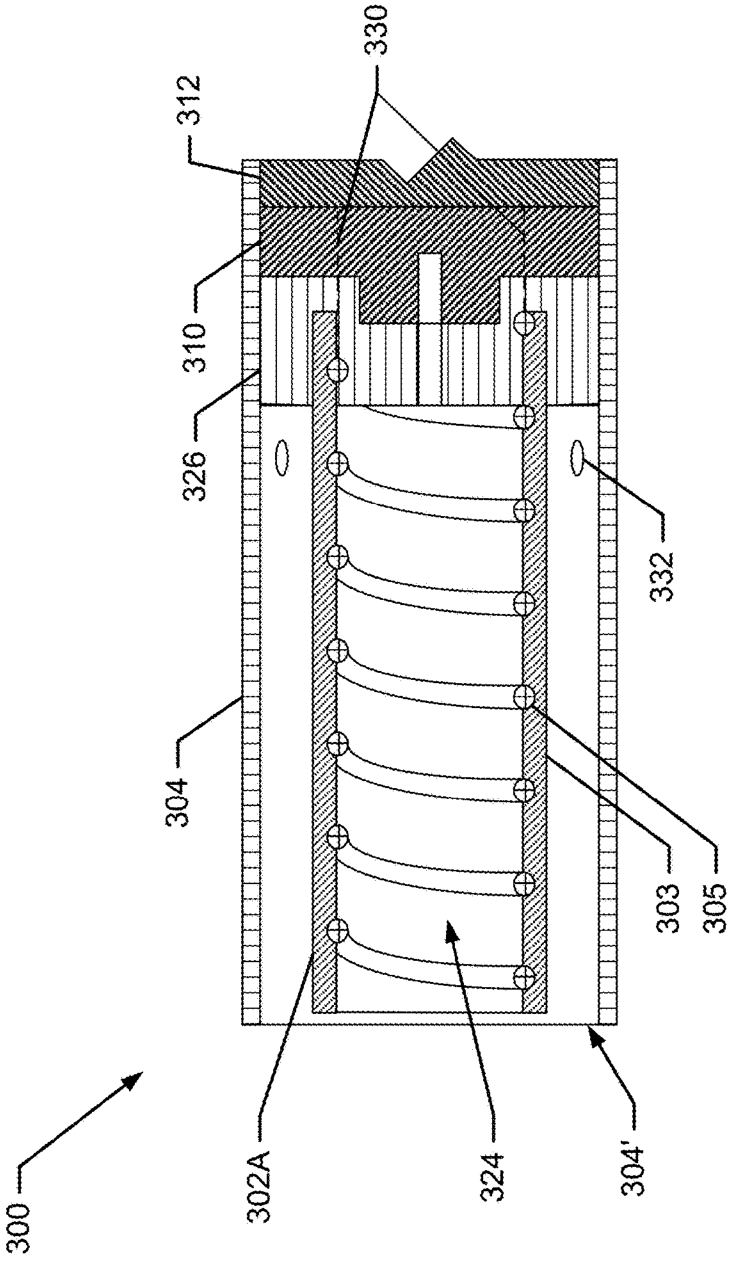
Figure 5:
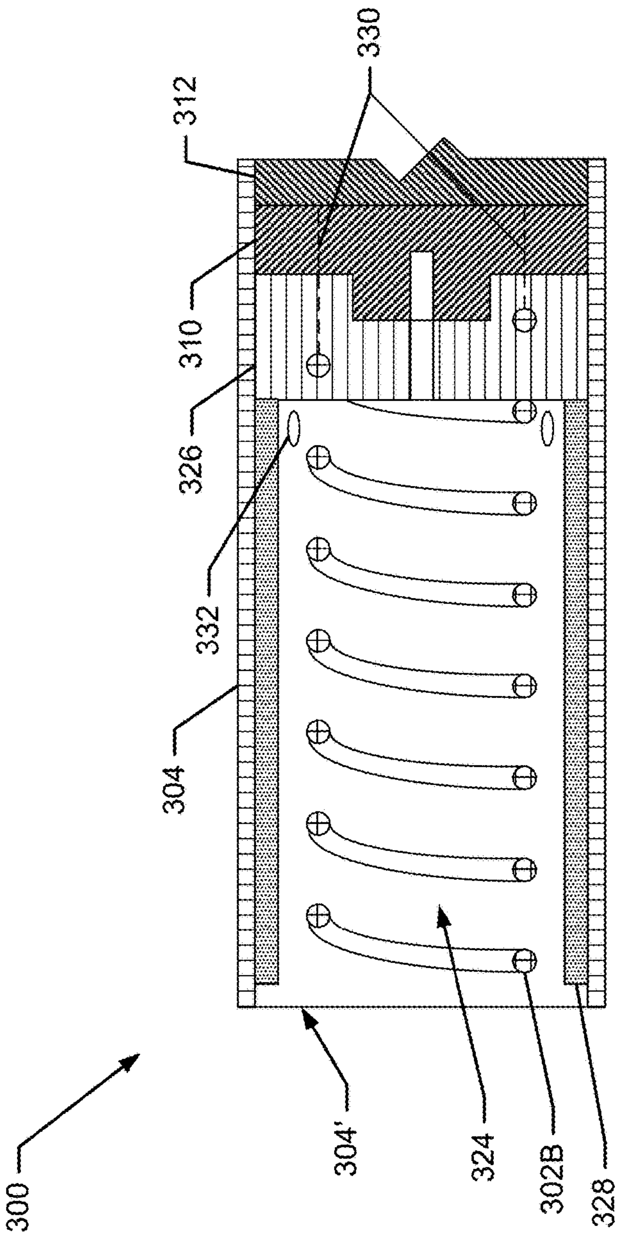
Figure 6:
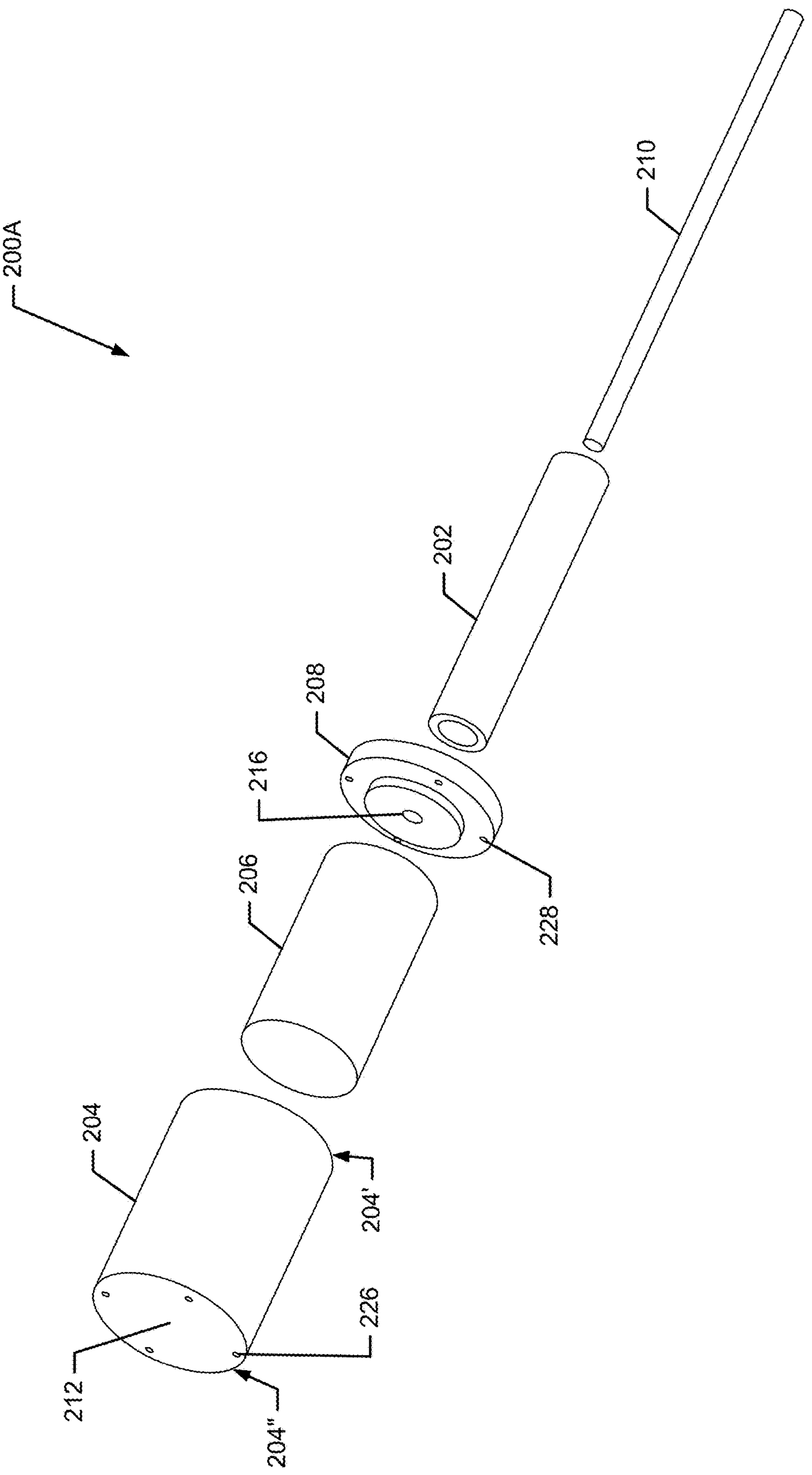
Figure 7:
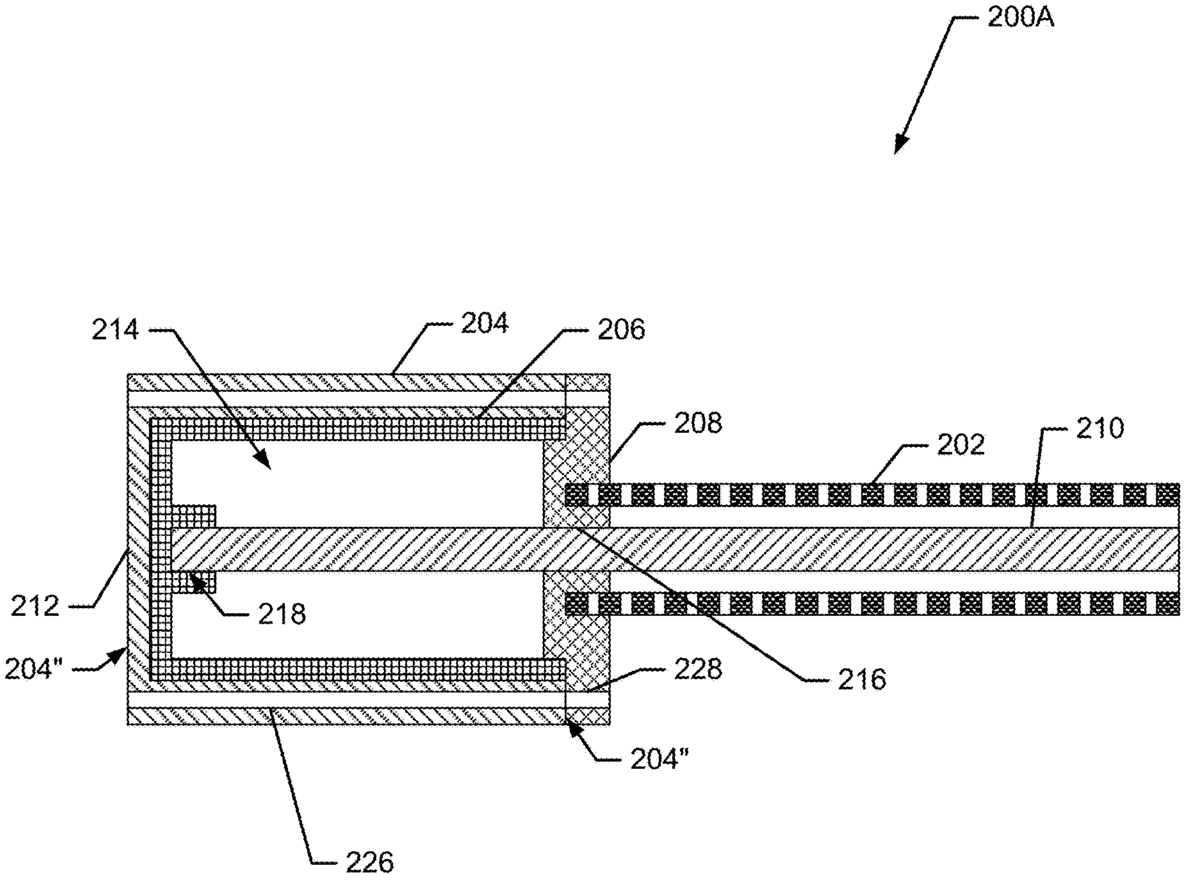
Figure 8:
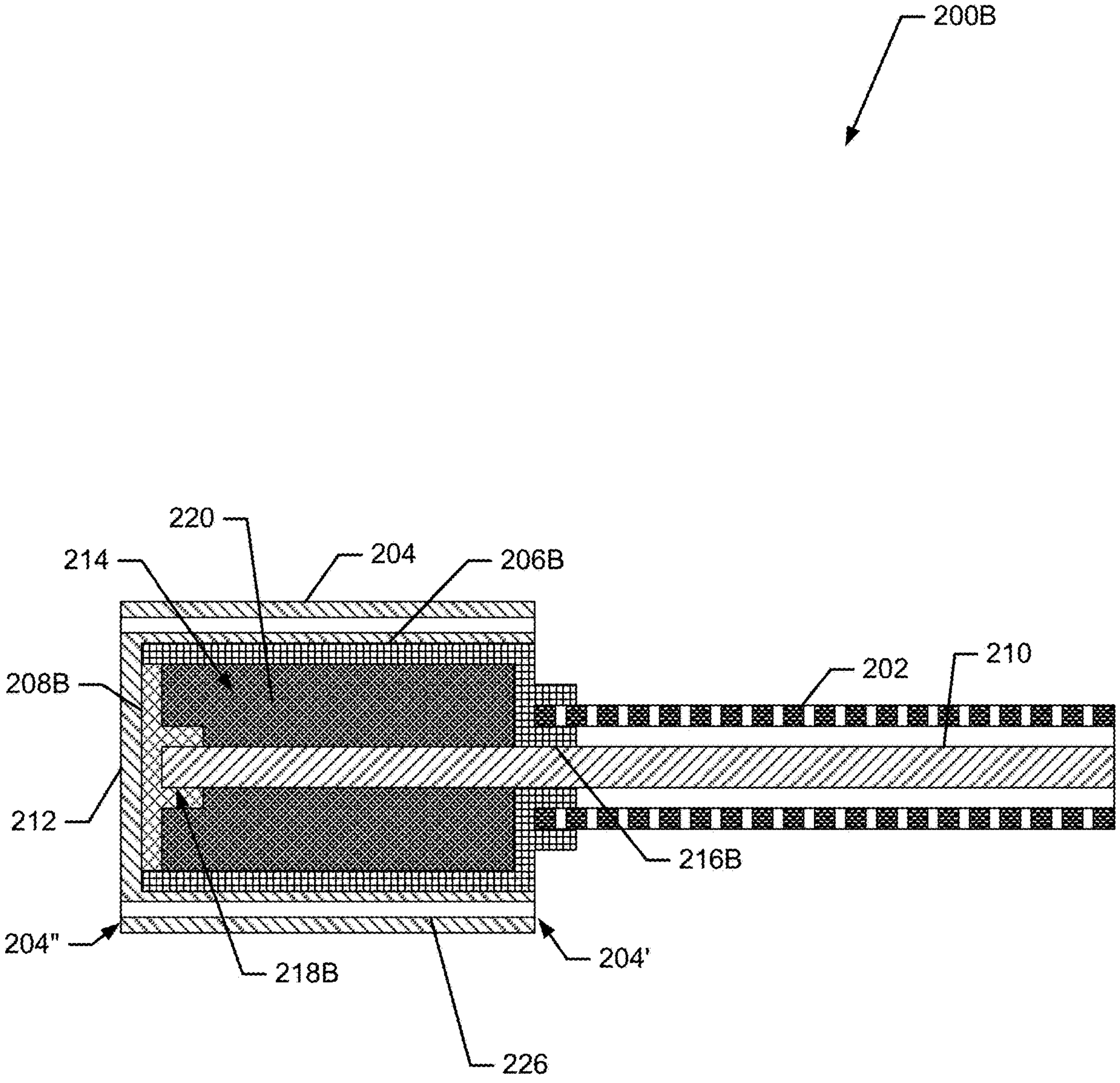
Figure 9:
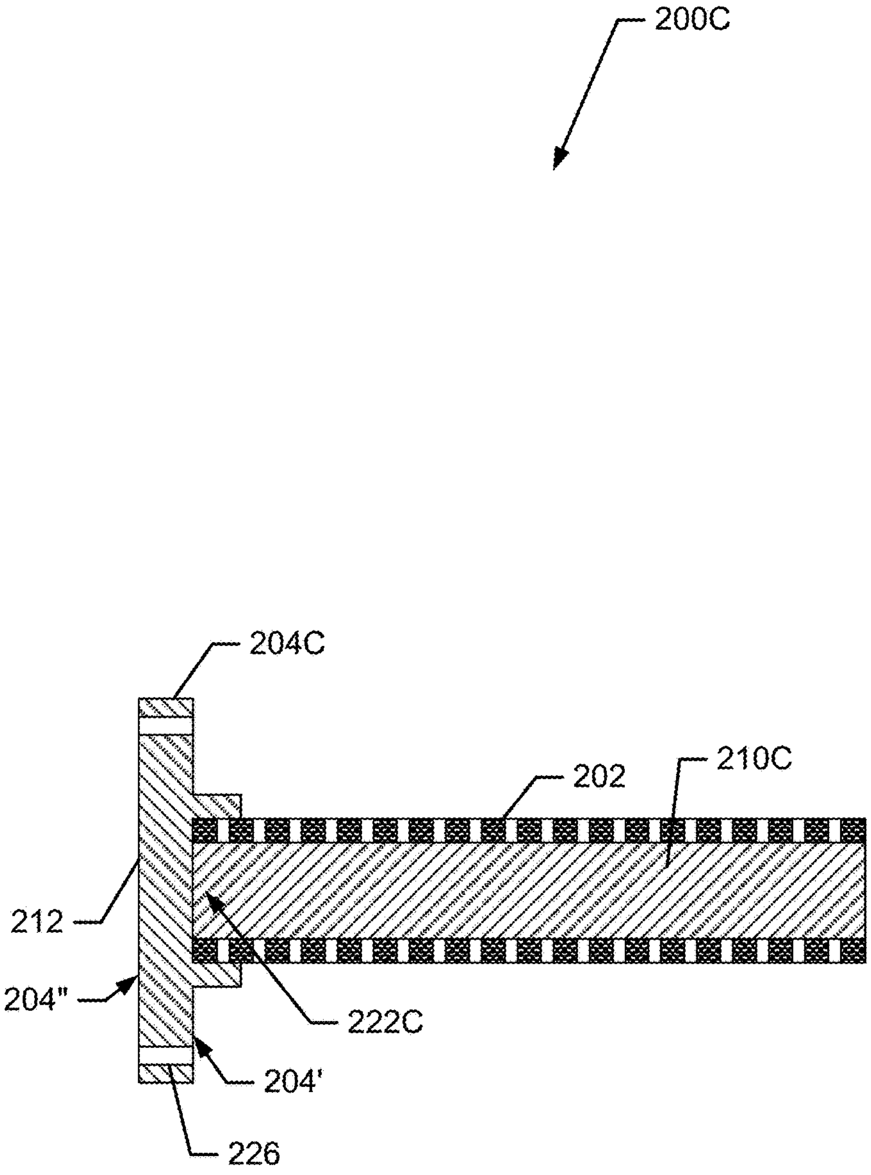
Figure 10:
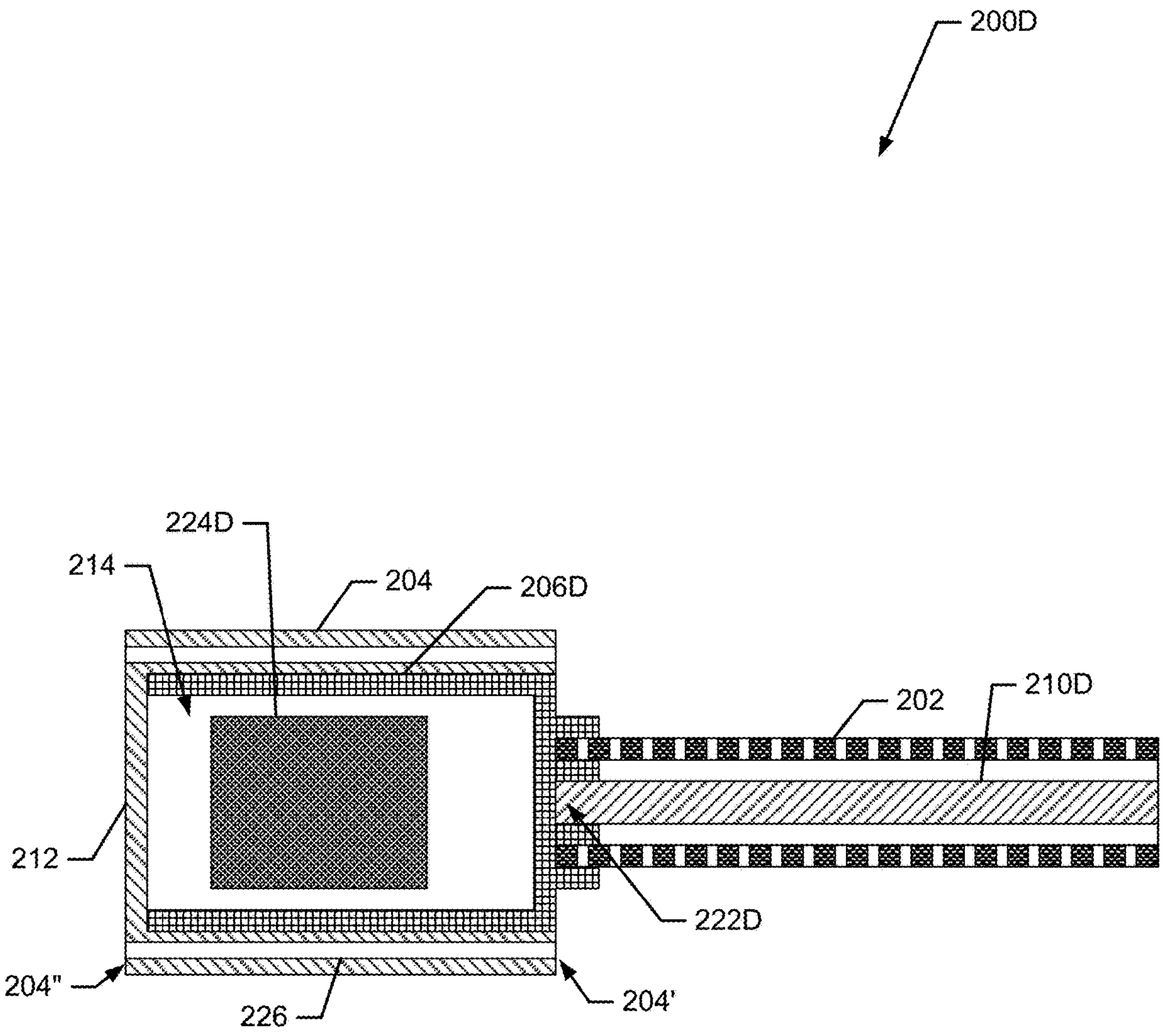
Figure 11:
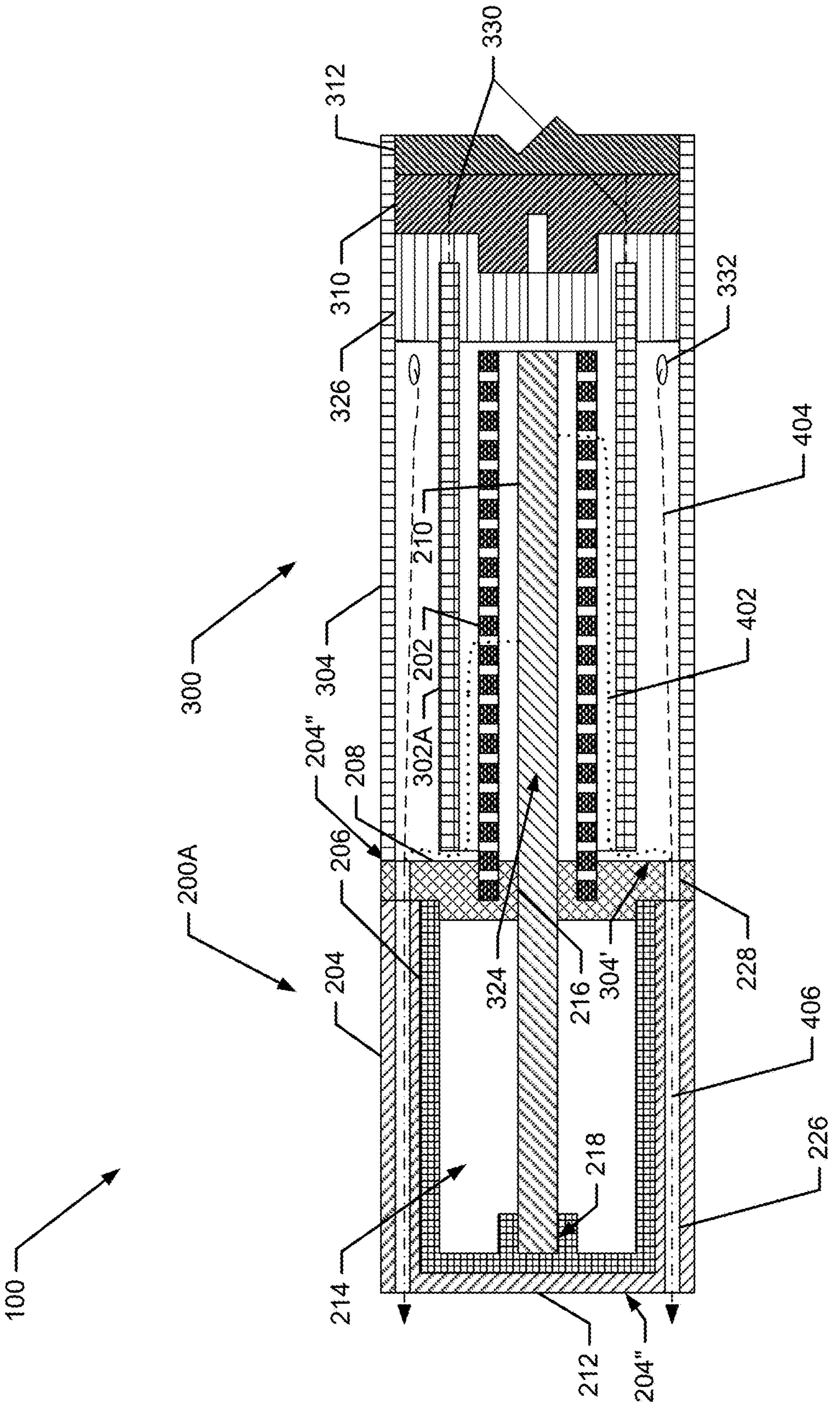
Figure 12:
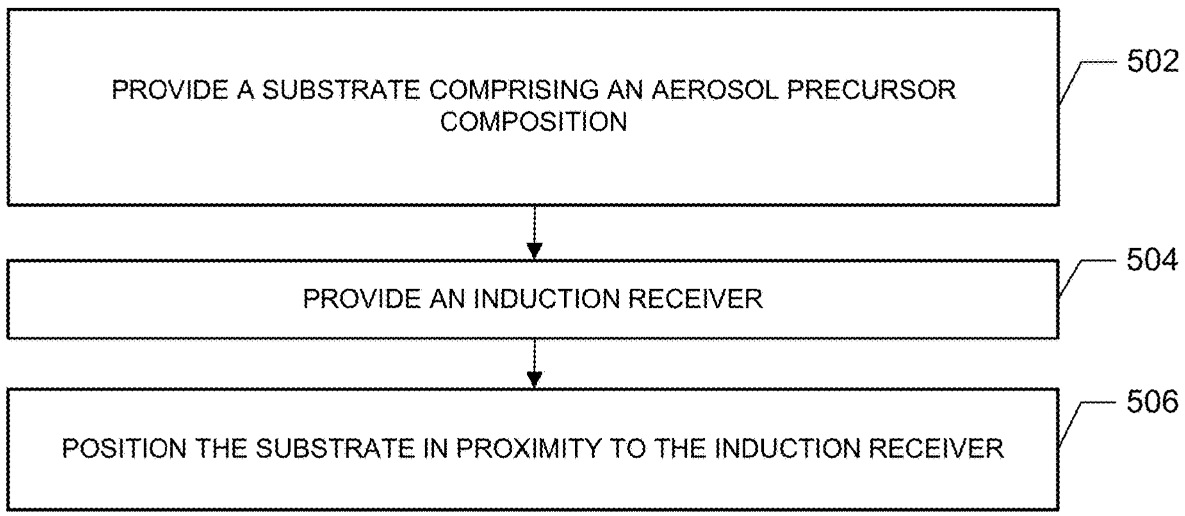
Figure 13:
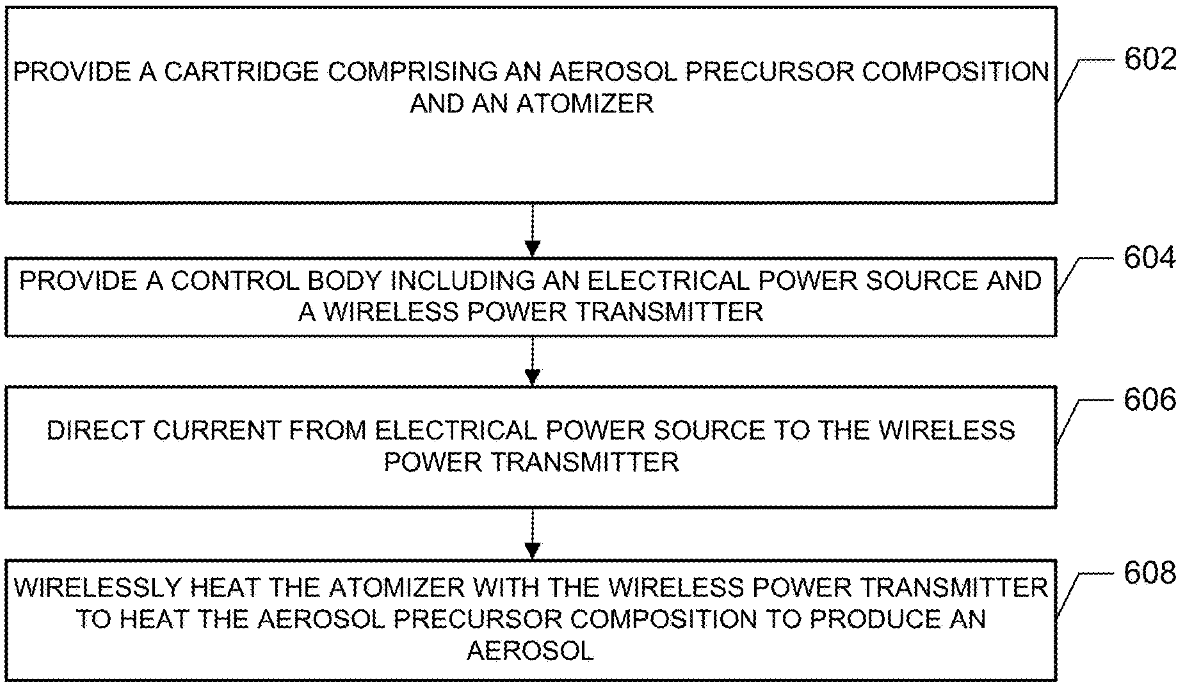

Having thus described the disclosure in the foregoing general terms, reference will now be made to the accompanying drawings, which are not necessarily drawn to scale, and wherein:

FIG. 1 illustrates a perspective view of an aerosol delivery device comprising a cartridge and a control body, wherein the cartridge and the control body are coupled to one another according to an example embodiment of the present disclosure;

FIG. 2 illustrates a perspective view of the aerosol delivery device of FIG. 1 wherein the cartridge and the control body are decoupled from one another according to an example embodiment of the present disclosure;

FIG. 3 illustrates an exploded view of the control body of FIG. 1 wherein an induction transmitter thereof defines a tubular configuration according to an example embodiment of the present disclosure;

FIG. 4 illustrates a sectional view through the control body of FIG. 3;

FIG. 5 illustrates a sectional view through the control body of FIG. 1 wherein an induction transmitter thereof defines a coiled configuration according to an example embodiment of the present disclosure;

FIG. 6 illustrates an exploded view of the cartridge of FIG. 1 wherein a substrate thereof extends into an internal compartment defined by a container according to a first example embodiment of the present disclosure;

FIG. 7 illustrates a sectional view through the cartridge of FIG. 6;

FIG. 8 illustrates a sectional view through the cartridge of FIG. 1 including a reservoir substrate in an internal compartment defined by a container according to a second example embodiment of the present disclosure;

FIG. 9 illustrates a sectional view through the cartridge of FIG. 1 including a substrate in contact with an induction receiver according to a third example embodiment of the present disclosure;

FIG. 10 illustrates a sectional view through the cartridge of FIG. 1 including an electronic control component according to a fourth example embodiment of the present disclosure;

FIG. 11 illustrates a sectional view through the aerosol delivery device of FIG. 1 including the cartridge of FIG. 6 and the control body of FIG. 3 according to an example embodiment of the present disclosure;

FIG. 12 schematically illustrates a method for assembling an aerosol delivery device according to an example embodiment of the present disclosure; and FIG. 13 schematically illustrates a method for aerosolization according to an example embodiment of the present disclosure.

DETAILED DESCRIPTION OF PREFERRED EMBODIMENTS

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural variations unless the context clearly dictates otherwise.

The present disclosure provides descriptions of aerosol delivery devices. The aerosol delivery devices may use electrical energy to heat a material (preferably without combusting the material to any significant degree) to form an inhalable substance; such articles most preferably being sufficiently compact to be considered "hand-held" devices. An aerosol delivery device may provide some or all of the sensations (e.g., inhalation and exhalation rituals, types of tastes or flavors, organoleptic effects, physical feel, use rituals, visual cues such as those provided by visible aerosol, and the like) of smoking a cigarette, cigar, or pipe, without any substantial degree of combustion of any component of that article or device. The aerosol delivery device may not produce smoke in the sense of the aerosol resulting from by-products of combustion or pyrolysis of tobacco, but rather, that the article or device most preferably yields vapors (including vapors within aerosols that can be considered to be visible aerosols that might be considered to be described as smoke-like) resulting from volatilization or vaporization of certain components of the article or device, although in other embodiments the aerosol may not be visible. In highly preferred embodiments, aerosol delivery devices may incorporate tobacco and/or components derived from tobacco. As such, the aerosol delivery device can be characterized as an electronic smoking article such as an electronic cigarette or "e-cigarette." In another embodiment the aerosol delivery device may be characterized as a heat-not-burn cigarette. Further, it should be understood that the description of the mechanisms, components, features, apparatuses, devices, and methods disclosed herein are discussed in terms of embodiments relating to aerosol delivery mechanisms by way of example only, and may be embodied and used in various other products and methods.

Aerosol delivery devices of the present disclosure also can be characterized as being vapor-producing articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like.

In use, aerosol delivery devices of the present disclosure may be subjected to many of the physical actions employed by an individual in using a traditional type of smoking article (e.g., a cigarette, cigar or pipe that is employed by lighting and inhaling tobacco). For example, the user of an aerosol delivery device of the present disclosure can hold that article much like a traditional type of smoking article, draw on one end of that article for inhalation of aerosol produced by that article, take puffs at selected intervals of time, etc.

Aerosol delivery devices of the present disclosure generally include a number of components provided within an outer shell or body. The overall design of the outer shell or body can vary, and the format or configuration of the outer body that can define the overall size and shape of the smoking article can vary. Typically, an elongated body resembling the shape of a cigarette or cigar can be a formed from a single, unitary shell; or the elongated body can be formed of two or more separable pieces. For example, an aerosol delivery device can comprise an elongated shell or body that can be substantially tubular in shape and, as such, resemble the shape of a conventional cigarette or cigar. In one embodiment, all of the components of the aerosol delivery device are contained within one outer body or shell. Alternatively, an aerosol delivery device can comprise two or more shells that are joined and are separable. For example, an aerosol delivery device can possess at one end a control body comprising a shell containing one or more reusable components (e.g., a rechargeable battery and various electronics for controlling the operation of that article), and at the other end and removably attached thereto a shell containing a disposable portion (e.g., a disposable flavor-containing cartridge). More specific formats, configurations and arrangements of components within the single shell type of unit or within a multi-piece separable shell type of unit will be evident in light of the further disclosure provided herein. Additionally, various aerosol delivery device designs and component arrangements can be appreciated upon consideration of the commercially available aerosol delivery devices.

Aerosol delivery devices of the present disclosure most preferably comprise some combination of a power source (i.e., an electrical power source), at least one controller (e.g., means for actuating, controlling, regulating and/or ceasing power for heat generation, such as by controlling electrical current flow from the power source to other components of the aerosol delivery device), a heater or heat generation component (e.g., an electrical resistance heating element or component commonly referred to as part of an "atomizer"), and an aerosol precursor composition (e.g., commonly a liquid capable of yielding an aerosol upon application of sufficient heat, such as ingredients commonly referred to as "smoke juice," "e-liquid" and "e-juice", and/or a solid or semi-solid tobacco material), and a mouthend region or tip for allowing draw upon the aerosol delivery device for aerosol inhalation (e.g., a defined air flow path through the article such that aerosol generated can be withdrawn therefrom upon draw).

Alignment of the components within the aerosol delivery device of the present disclosure can vary. In specific embodiments, the aerosol precursor composition can be located near an end of the aerosol delivery device which may be configured to be positioned proximal to the mouth of a user so as to maximize aerosol delivery to the user. Other configurations, however, are not excluded. Generally, the heating element can be positioned sufficiently near the aerosol precursor composition so that heat from the heating element can volatilize the aerosol precursor (as well as one or more flavorants, medicaments, or the like that may likewise be provided for delivery to a user) and form an aerosol for delivery to the user. When the heating element heats the aerosol precursor composition, an aerosol is formed, released, or generated in a physical form suitable for inhalation by a consumer. It should be noted that the foregoing terms are meant to be interchangeable such that reference to release, releasing, releases, or released includes form or generate, forming or generating, forms or generates, and formed or generated. Specifically, an inhalable substance is released in the form of a vapor or aerosol or mixture thereof, wherein such terms are also interchangeably used herein except where otherwise specified.

As noted above, the aerosol delivery device may incorporate a battery or other electrical power source (e.g., a capacitor) to provide current flow sufficient to provide various functionalities to the aerosol delivery device, such as powering of a heater, powering of control systems, powering of indicators, and the like. The power source can take on various embodiments. Preferably, the power source is able to deliver sufficient power to rapidly heat the heating element to provide for aerosol formation and power the aerosol delivery device through use for a desired duration of time. The power source preferably is sized to fit conveniently within the aerosol delivery device so that the aerosol delivery device can be easily handled. Additionally, a preferred power source is of a sufficiently light weight to not detract from a desirable smoking experience.

More specific formats, configurations and arrangements of components within the aerosol delivery device of the present disclosure will be evident in light of the further disclosure provided hereinafter. Additionally, the selection of various aerosol delivery device components can be appreciated upon consideration of the commercially available electronic aerosol delivery devices. Further, the arrangement of the components within the aerosol delivery device can also be appreciated upon consideration of the commercially available electronic aerosol delivery devices.

As described hereinafter, the present disclosure relates to aerosol delivery devices. Aerosol delivery devices may be configured to heat an aerosol precursor composition to produce an aerosol. In some embodiments the aerosol delivery devices may comprise heat-not-burn devices, configured to heat a solid aerosol precursor composition (an extruded tobacco rod) or a semi-solid aerosol precursor composition (e.g., a glycerin-loaded tobacco paste). In another embodiment the aerosol delivery devices may be configured to heat and produce an aerosol from a fluid aerosol precursor composition (e.g., a liquid aerosol precursor composition). Such aerosol delivery devices may include so-called electronic cigarettes.

Regardless of the type of aerosol precursor composition heated, aerosol delivery devices may include a heating element configured to heat the aerosol precursor composition. In some embodiments the heating element may comprise a resistive heating element. Resistive heating elements may be configured to produce heat when an electrical current is directed therethrough. Such heating elements often comprise a metal material and are configured to produce heat as a result of the electrical resistance associated with passing an electrical current therethrough. Such resistive heating elements may be positioned in proximity to the aerosol precursor composition. For example, in some embodiments the resistive heating elements may comprise one or more coils of a wire wound about a liquid transport element (e.g., a wick, which may comprise a porous ceramic, carbon, cellulose acetate, polyethylene terephthalate, fiberglass, or porous sintered glass) configured to draw an aerosol precursor composition therethrough. Alternatively, the heating element may be positioned in contact with a solid or semi-solid aerosol precursor composition. Such configurations may heat the aerosol precursor composition to produce an aerosol.

In some embodiments aerosol delivery devices may include a control body and a cartridge. The control body may be reusable, whereas the cartridge may be configured for a limited number of uses and/or configured to be disposable. The cartridge may include the aerosol precursor composition. In order to heat the aerosol precursor composition, the heating element may also be positioned in the cartridge. The controller may include an electrical power source, which may be rechargeable or replaceable, and thereby the control body may be reused with multiple cartridges.

Although the above-described aerosol delivery devices may be employed to heat an aerosol precursor composition to produce aerosol, such configurations may suffer from one or more disadvantages. In this regard, resistive heating elements may comprise a wire defining one or more coils that contact the aerosol precursor composition. For example, as noted above, the coils may wrap around a liquid transport element (e.g., a wick) to heat and aerosolize an aerosol precursor composition directed to the heating element through the liquid transport element. However, as a result of the coils defining a relatively small surface area, some of the aerosol precursor composition may be heated to an unnecessarily high extent during aerosolization, thereby wasting energy. Alternatively or additionally, some of the aerosol precursor composition that is not in contact with the coils of the heating element may be heated to an insufficient extent for aerosolization. Accordingly, insufficient aerosolization may occur, or aerosolization may occur with wasted energy.

Further, as noted above, resistive heating elements produce heat when electrical current is directed therethrough. Accordingly, as a result of positioning the heating element in contact with the aerosol precursor composition, charring of the aerosol precursor composition may occur. Such charring may occur as a result of the heat produced by the heating element and/or as a result of electricity traveling through the aerosol precursor composition at the heating element. Charring may result in build-up of material on the heating element. Such material build-up may negatively affect the taste of the aerosol produced from the aerosol precursor composition.

As further described above, aerosol delivery devices may comprise a control body including an electrical power source and a cartridge comprising a resistive heating element and an aerosol precursor composition. In order to direct electrical current to the resistive heating element, the control body and the cartridge may include electrical connectors configured to engage one another when the cartridge is engaged with the control body. However, usage of such electrical connectors may further complicate and increase the cost of such aerosol delivery devices. Additionally, in embodiments of aerosol delivery devices including a fluid aerosol precursor composition, leakage thereof may occur at the terminals or other connectors within the cartridge.

Thus, embodiments of the present disclosure are directed to aerosol delivery devices which may avoid some or all of the problems noted above. In this regard, FIG. 1 illustrates an aerosol delivery device 100 according to an example embodiment of the present disclosure. The aerosol delivery device 100 may include a cartridge 200 and a control body 300. The cartridge 200 and the control body 300 can be permanently or detachably aligned in a functioning relationship. In this regard, FIG. 1 illustrates the aerosol delivery device 100 in a coupled configuration, whereas FIG. 2 illustrates the aerosol delivery device in a decoupled configuration. Various mechanisms may connect the cartridge 200 to the control body 300 to result in a threaded engagement, a press-fit engagement, an interference fit, a magnetic engagement, or the like. The aerosol delivery device 100 may be substantially rod-like, substantially tubular shaped, or substantially cylindrically shaped in some embodiments when the cartridge 200 and the control body 300 are in an assembled configuration.

In specific embodiments, one or both of the cartridge 200 and the control body 300 may be referred to as being disposable or as being reusable. For example, the control body 300 may have a replaceable battery or a rechargeable battery and thus may be combined with any type of recharging technology, including connection to a typical alternating current electrical outlet, connection to a car charger (i.e., cigarette lighter receptacle), and connection to a computer, such as through a universal serial bus (USB) cable. Further, in some embodiments the cartridge 200 may comprise a single-use cartridge, as disclosed in U.S. Pat. No. 8,910,639 to Chang et al., which is incorporated herein by reference in its entirety.

FIG. 3 illustrates an exploded view of the control body 300 of the aerosol delivery device 100 according to an example embodiment of the present disclosure. As illustrated, the control body 300 may comprise an induction transmitter 302A, an outer body 304, a flow sensor 310 (e.g., a puff sensor or pressure switch), a controller 312, a spacer 314, an electrical power source 316 (e.g., a battery, which may be rechargeable, and/or a capacitor), a circuit board with an indicator 318 (e.g., a light emitting diode (LED)), a connector circuit 320, and an end cap 322. Examples of electrical power sources are described in U.S. Pat. App. Pub. No. 2010/0028766 by Peckerar et al., the disclosure of which is incorporated herein by reference in its entirety.

With respect to the flow sensor 310, representative current regulating components and other current controlling components including various microcontrollers, sensors, and switches for aerosol delivery devices are described in U.S. Pat. No. 4,735,217 to Gerth et al., U.S. Pat. Nos. 4,922,901, 4,947,874, and 4,947,875, all to Brooks et al., U.S. Pat. No. 5,372,148 to McCafferty et al., U.S. Pat. No. 6,040,560 to Fleischhauer et al., U.S. Pat. No. 7,040,314 to Nguyen et al., and U.S. Pat. No. 8,205,622 to Pan, all of which are incorporated herein by reference in their entireties. Reference also is made to the control schemes described in U.S. App. Pub. No. 2014/0270727 to Ampolini et al., which is incorporated herein by reference in its entirety.

In one embodiment the indicator 318 may comprise one or more light emitting diodes. The indicator 318 can be in communication with the controller 312 through the connector circuit 320 and be illuminated, for example, during a user drawing on a cartridge (e.g., cartridge 200 of FIG. 2) coupled to the control body 300, as detected by the flow sensor 310. The end cap 322 may be adapted to make visible the illumination provided thereunder by the indicator 318. Accordingly, the indicator 318 may be illuminated during use of the aerosol delivery device 100 to simulate the lit end of a smoking article. However, in other embodiments the indicator 318 can be provided in varying numbers and can take on different shapes and can even be an opening in the outer body (such as for release of sound when such indicators are present).

Still further components can be utilized in the aerosol delivery device of the present disclosure. For example, U.S. Pat. No. 5,154,192 to Sprinkel et al. discloses indicators for smoking articles; U.S. Pat. No. 5,261,424 to Sprinkel, Jr. discloses piezoelectric sensors that can be associated with the mouth-end of a device to detect user lip activity associated with taking a draw and then trigger heating of a heating device; U.S. Pat. No. 5,372,148 to McCafferty et al. discloses a puff sensor for controlling energy flow into a heating load array in response to pressure drop through a mouthpiece; U.S. Pat. No. 5,967,148 to Harris et al. discloses receptacles in a smoking device that include an identifier that detects a non-uniformity in infrared transmissivity of an inserted component and a controller that executes a detection routine as the component is inserted into the receptacle; U.S. Pat. No. 6,040,560 to Fleischhauer et al. describes a defined executable power cycle with multiple differential phases; U.S. Pat. No. 5,934,289 to Watkins et al. discloses photonic-optronic components; U.S. Pat. No. 5,954,979 to Counts et al. discloses means for altering draw resistance through a smoking device; U.S. Pat. No. 6,803,545 to Blake et al. discloses specific battery configurations for use in smoking devices; U.S. Pat. No. 7,293,565 to Griffen et al. discloses various charging systems for use with smoking devices; U.S. Pat. No. 8,402,976 to Fernando et al. discloses computer interfacing means for smoking devices to facilitate charging and allow computer control of the device; U.S. Pat. No. 8,689,804 to Fernando et al. discloses identification systems for smoking devices; and WO 2010/003480 by Flick discloses a fluid flow sensing system indicative of a puff in an aerosol generating system; all of the foregoing disclosures being incorporated herein by reference in their entireties. Further examples of components related to electronic aerosol delivery articles and disclosing materials or components that may be used in the present article include U.S. Pat. No. 4,735,217 to Gerth et al.; U.S. Pat. No. 5,249,586 to Morgan et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,896,006 to Hamano; U.S. Pat. No. 6,772,756 to Shayan; U.S. Pat. Nos. 8,156,944 and 8,375,957 to Hon; U.S. Pat. No. 8,794,231 to Thorens et al.; U.S. Pat. No. 8,851,083 to Oglesby et al.; U.S. Pat. Nos. 8,915,254 and 8,925,555 to Monsees et al.; U.S. Pat. App. Pub. Nos. 2006/0196518 and 2009/0188490 to Hon; U.S. Pat. App. Pub. No. 2010/0024834 to Oglesby et al.; U.S. Pat. App. Pub. No. 2010/0307518 to Wang; U.S. Pat. App. Pub. No. 2014/0261408 to DePiano et al.; WO 2010/091593 to Hon; and WO 2013/089551 to Foo, each of which is incorporated herein by reference in its entirety. Further, U.S. patent application Ser. No. 14/881,392 to Worm et al., filed Oct. 13, 2015, discloses capsules that may be included in aerosol delivery devices and fob-shape configurations for aerosol delivery devices, and is incorporated herein by reference in its entirety. A variety of the materials disclosed by the foregoing documents may be incorporated into the present devices in various embodiments, and all of the foregoing disclosures are incorporated herein by reference in their entireties.

Each of the components of the control body 300 may be at least partially received in the outer body 304. The outer body 304 may extend from an engagement end 304' to an outer end 304". The end cap 322 may be positioned at, and engaged with, the outer end 304" of the outer body 304. Thereby, the end cap 322, which may be translucent or transparent, may be illuminated by the indicator 318 in order to simulate the lit end of a smoking article or perform other functions as described above. The opposing engagement end 304' of the outer body 304 may be configured to engage the cartridge 200.

FIG. 4 schematically illustrates a partial sectional view through the control body 300 proximate the engagement end 304' of the outer body 304. As illustrated, the induction transmitter 302A may extend proximate the engagement end 304' of the outer body 304. In one embodiment, as illustrated in FIGS. 3 and 4, the induction transmitter 302A may define a tubular configuration. As illustrated in FIG. 4, the induction transmitter 302A may include a coil support 303 and a coil 305. The coil support 303, which may define a tubular configuration, may be configured to support the coil 303 such that the coil 305 does not move into contact with, and thereby short-circuit with, the induction receiver or other structures. The coil support 303 may comprise a nonconductive material, which may be substantially transparent to the oscillating magnetic field produced by the coil 305. The coil 305 may be imbedded in, or otherwise coupled to, the coil support 303. In the illustrated embodiment the coil 305 is engaged with an inner surface of the coil support 303 so as to reduce any losses associated with transmitting the oscillating magnetic field to the induction receiver. However, in other embodiments the coil may be positioned at an outer surface of the coil support or fully imbedded in the coil support. Further, in some embodiments the coil may comprise an electrical trace printed on or otherwise coupled to the coil support, or a wire. In either embodiment the coil may define a helical configuration.

In an alternate embodiment, as illustrated in FIG. 5, the induction transmitter 302B may define a coiled configuration. In each embodiment the induction transmitter 302 may define an inner chamber 324 about which the induction transmitter extends.

As further illustrated in FIGS. 3-5, in some embodiments the induction transmitter 302 may be coupled to a support member 326. The support member 326 may be configured to engage the induction transmitter 302 and support the induction transmitter 302 within the outer body 304. For example, the induction transmitter 302 may be imbedded in, or otherwise coupled to the support member 326, such that the induction transmitter is fixedly positioned within the outer body 304. By way of further example, the induction transmitter 302 may be injection molded into the support member 304.

The support member 326 may engage an internal surface of the outer body 304 to provide for alignment of the support member with respect to the outer body. Thereby, as a result of the fixed coupling between the support member 326 and the induction transmitter 302, a longitudinal axis of the induction transmitter may extend substantially parallel to a longitudinal axis of the outer body 304. Thus, the induction transmitter 302 may be positioned out of contact with the outer body 304, so as to avoid transmitting current from the induction transmitter to the outer body. However, in some embodiments an optional insulator 328 may be positioned between the induction transmitter 302 and the outer body 304, as illustrated in FIG. 5, so as to prevent contact therebetween. As may be understood, the insulator 328 and the support member 326 may comprise any nonconductive material such as an insulating polymer (e.g., plastic or cellulose), glass, rubber, and porcelain. Alternatively, the induction transmitter 302 may contact the outer body 304 in embodiments in which the outer body is formed from a nonconductive material such as a plastic, glass, rubber, or porcelain.

As described below in detail, the induction transmitter 302 may be configured to receive an electrical current from the electrical power source 316 and wirelessly heat the cartridge 200 (see, e.g., FIG. 2). Thus, as illustrated in FIGS. 4 and 5, the induction transmitter 302 may include electrical connectors 330 configured to supply the electrical current thereto. For example, the electrical connectors 330 may connect the induction transmitter 302 to the controller 312. Thereby, current from the electrical power source 316 may be selectively directed to the induction transmitter 302 as controlled by the controller 312. For example, the controller 312 may direct current from the electrical power source 316 (see, e.g., FIG. 3) to the induction transmitter 302 when a draw on the aerosol delivery device 100 is detected by the flow sensor 310. The electrical connectors 330 may comprise, by way of example, terminals, wires, or any other embodiment of connector configured to transmit electrical current therethrough. Further, the electrical connectors 330 may include a negative electrical connector and a positive electrical connector.

In some embodiments the electrical power source 316 may comprise a battery and/or a capacitor, which may supply direct current. As described elsewhere herein, operation of the aerosol delivery device may require directing alternating current to the induction transmitter 302 to produce an oscillating magnetic field in order to induce eddy currents in the induction receiver. Accordingly, in some embodiments the controller 312, or a separate component of the control body 300, may include an inverter or an inverter circuit configured to transform direct current provided by the electrical power source 316 to alternating current that is provided to the induction transmitter 302.

FIG. 6 illustrates an exploded view of a first embodiment of the cartridge 200A. As illustrated, the cartridge 200A may include an induction receiver 202, an outer body 204, a container 206, a sealing member 208, and a substrate 210. The outer body 204 may extend between an engagement end 204' and an outer end 204". Some or all of the remaining components of the cartridge 200A may be positioned at least partially within the outer body 204.

The cartridge 200A may additionally include a mouthpiece 212. The mouthpiece 212 may be integral with the outer body 204 or the container 206 or a separate component. The mouthpiece 212 may be positioned at the outer end 204" of the outer body 204.

FIG. 7 illustrates a sectional view through the cartridge 200A in an assembled configuration. As illustrated, the container 206 may be received within the outer body 204. Further the sealing member 208 may be engaged with the container 206 to define an internal compartment 214. As further illustrated in FIG. 7, in some embodiments the sealing member 208 may additionally engage the outer body 204.

In some embodiments the sealing member 208 may comprise an elastic material such as a rubber or silicone material. In this embodiment the sealing material 208 may compress to form a tight seal with the container 206 and/or the outer body 204. An adhesive may be employed to further improve the seal between the sealing member 208 and the container 206 and/or the outer body 204. In another embodiment the sealing member 208 may comprise an inelastic material such as a plastic material or a metal material. In these embodiments the sealing member 208 may be adhered or welded (e.g., via ultrasonic welding) to the container 206 and/or the outer body 204. Accordingly, via one or more of these mechanisms, the sealing member 208 may substantially seal the internal compartment 214 shut.

The induction receiver 202 may be engaged with the sealing member 208. In one embodiment the induction receiver 202 may be partially imbedded in the sealing member 208. For example, the induction receiver 202 may be injection molded into the sealing member 208 such that a tight seal and connection is formed therebetween. Accordingly, the sealing member 208 may retain the induction receiver at a desired position. For example, the induction receiver 202 may be positioned such that a longitudinal axis of the induction receiver extends substantially coaxially with a longitudinal axis of the outer body 204.

Further, the substrate 210 may engage the sealing member 208. In one embodiment the substrate 210 may extend through the sealing member 208. In this regard, the sealing member 208 may define an aperture 216 extending therethrough, and through which the substrate 210 is received. Thereby, the substrate 210 may extend into the internal compartment 214. For example, as illustrated in FIG. 7, an end of the substrate 210 may be received in a pocket 218 defined by the container 206. Accordingly, the container 206 and the sealing member 208 may each engage the substrate 210 and cooperatively maintain the substrate at a desired position. For example, a longitudinal axis of the substrate 210 may be positioned substantially coaxial with a longitudinal axis of the induction receiver 202. Thereby, as illustrated, in some embodiments the substrate 210 may be positioned in proximity to, but out of contact with, the induction receiver 202. By avoiding direct contact between the substrate 210 and the induction receiver 202, the induction coil may remain substantially free of residue buildup from use, and hence the cartridge may optionally be refilled with aerosol precursor composition and/or a new substrate or otherwise reused. However, as discussed below, direct contact between the substrate and the induction receiver may be preferable in some embodiments.

The substrate 210 may include an aerosol precursor composition. The aerosol precursor composition may comprise one or more of a solid tobacco material, a semi-solid tobacco material, and a liquid aerosol precursor composition. For example, solid tobacco materials and semi-solid tobacco materials may be employed in embodiments of the aerosol delivery device 100 defining so-called heat-not-burn cigarettes. Conversely, by way of further example, fluid (e.g., liquid) aerosol precursor compositions may be employed in embodiments of the aerosol delivery device 100 defining so-called electronic cigarettes.

Representative types of liquid aerosol precursor components and formulations are set forth and characterized in U.S. Pat. No. 7,726,320 to Robinson et al. and U.S. Pat. Pub. Nos. 2013/0008457 to Zheng et al.; 2013/0213417 to Chong et al. 2015/0020823 to Lipowicz et al.; and 2015/0020830 to Koller, as well as WO 2014/182736 to Bowen et al. and U.S. Pat. No. 8,881,737 to Collett et al., the disclosures of which are incorporated herein by reference. Other aerosol precursors that may be employed include the aerosol precursors that have been incorporated in the VUSE® product by R. J. Reynolds Vapor Company, the BLU product by Lorillard Technologies, the MISTIC MENTHOL product by Mistic Ecigs, and the VYPE product by CN Creative Ltd. Also desirable are the so-called "smoke juices" for electronic cigarettes that have been available from Johnson Creek Enterprises LLC. Embodiments of effervescent materials can be used with the aerosol precursor, and are described, by way of example, in U.S. Pat. App. Pub. No. 2012/0055494 to Hunt et al., which is incorporated herein by reference. Further, the use of effervescent materials is described, for example, in U.S. Pat. No. 4,639,368 to Niazi et al.; U.S. Pat. No. 5,178,878 to Wehling et al.; U.S. Pat. No. 5,223,264 to Wehling et al.; U.S. Pat. No. 6,974,590 to Pather et al.; U.S. Pat. No. 7,381,667 to Bergquist et al.; U.S. Pat. No. 8,424,541 to Crawford et al; and U.S. Pat. No. 8,627,828 to Strickland et al., as well as US Pat. Pub. Nos. 2010/0018539 to Brinkley et al.; and 2010/0170522 to Sun et al.; and PCT WO 97/06786 to Johnson et al., all of which are incorporated by reference herein.

Representative types of solid and semi-solid aerosol precursor compositions and formulations are disclosed in U.S. Pat. No. 8,424,538 to Thomas et al.; U.S. Pat. No. 8,464,726 to Sebastian et al.; U.S. Pat. Appl. Pub. No. 2015/0083150 to Conner et al.; U.S. Pat. Appl. Pub. No. 2015/0157052 to Ademe et al.; and U.S. patent application Ser. No. 14/755,205, filed Jun. 30, 2015, to Nordskog et al.

In embodiments of the cartridge 200 wherein the aerosol precursor composition comprises a liquid or other fluid, the substrate 210 may be configured to retain the aerosol precursor composition therein and release a vapor therefrom when heat is applied thereto by the induction receiver 202 in the manner described below. In some embodiments the substrate 210 may retain a sufficient quantity of the aerosol precursor composition to last a desired extent. In other embodiments it may be preferable to provide the cartridge 200 with an increased capacity of the aerosol precursor composition. Examples of materials that may be employed in the substrate 210 in embodiments wherein the substrate is configured to hold a fluid aerosol precursor composition include a porous ceramic, carbon, cellulose acetate, polyethylene terephthalate, fiberglass, and porous sintered glass.

In this regard, as illustrated by way of example in FIGS. 6 and 7, in one embodiment the container 206 may comprise a reservoir and the internal compartment 214 may be configured to receive the liquid aerosol precursor composition. In this embodiment the substrate 210 may comprise a liquid transport element (e.g., a wick) configured to receive the aerosol precursor composition from the internal compartment 214 and transport the aerosol precursor composition therealong. Accordingly, the aerosol precursor composition may be transported from the internal compartment 214 to locations along the longitudinal length of the substrate 210 about which the induction receiver 202 extends.

As may be understood, the embodiment of the cartridge 200A illustrated in FIG. 7 is provided for example purposes only. In this regard, various alternative embodiments of cartridges 200 are provided herein by way of further example. Note that although the embodiments of the cartridge 200 are described separately herein, each of the respective components and features thereof may be combined in any manner except as may be otherwise noted herein.

By way of example, FIG. 8 illustrates a second embodiment of the cartridge 200B wherein the sealing member 208B is positioned proximate the outer end 204" of the outer body 204, as opposed to at the engagement end 204'. In this embodiment the container 206B may include the aperture 216B extending therethrough and the sealing member 208B may define the pocket 218B, in order to support the substrate 210 in substantially the same manner as described above. Accordingly, the sealing member 208 may be positioned at either the engagement end 204' of the container 206 (see, e.g., the container 200A of FIG. 7) or the outer end 204" of the container 206B (see, e.g., the container 200B of FIG. 8).

In some embodiments the container may be sufficiently sealed such that leakage of the aerosol precursor composition is substantially avoided. However, as illustrated in FIG. 8, in some embodiments the cartridge 200B may further comprise a reservoir substrate 220. As may be understood, the reservoir substrate 220 may be employed in any of the cartridges disclosed herein including an internal compartment 214.

In one embodiment the reservoir substrate 220 may comprise a plurality of layers of nonwoven fibers formed into substantially the shape of a tube fully or partially encircling the substrate 210 within the internal compartment 220. In other embodiments the reservoir substrate 220 may comprise a porous ceramic, carbon, cellulose acetate, polyethylene terephthalate, fiberglass, or porous sintered glass. Thereby, a liquid aerosol precursor composition can be sorptively retained by the reservoir substrate 220. As a result of contact between the reservoir substrate 220 and the reservoir 210, the reservoir substrate is in fluid communication with the substrate. Thus, the substrate 210 may be configured to transport the liquid aerosol precursor composition from the reservoir substrate 220 in the internal compartment 214 via capillary action or other liquid transport mechanisms to locations along the longitudinal length of the substrate 210 outside of the internal compartment.

As noted above, in some embodiments of the cartridge (see, e.g., the cartridges 200A, 200B of FIGS. 7 and 8), the substrate 210 may be positioned in proximity to, but out of contact with, the induction receiver 202. Such a configuration may avoid build-up of residue on the induction receiver due to the lack of direct contact therebetween. However, in other embodiments, as illustrated in a third embodiment of the cartridge 200C provided in FIG. 9, the substrate 210C may contact the induction receiver 202. Usage of this configuration may allow for a relatively larger substrate 210C, which may contain a relatively greater quantity of the aerosol precursor composition, without necessarily increasing the size of the induction receiver 202. Further, direct contact between the induction receiver and the substrate may facilitate heat transfer from the induction receiver to the substrate via convection, which may be significantly more efficient than the radiant heating employed in embodiments in which there is no direct contact therebetween. Accordingly, it should be understood that each of the embodiments of the cartridges disclosed herein may include direct contact between the induction receiver and the substrate and/or the aerosol precursor composition. Providing for direct contact between the substrate 210C and the induction receiver 202 may be employed, by way of example, in embodiments in which aerosol precursor composition comprises a solid tobacco material or a semi-solid tobacco material, which may be less prone to causing residue build-up on the induction receiver than a liquid aerosol precursor composition.

In the embodiments of the cartridges 200A, 200B illustrated in FIGS. 6-8, the substrate 210 extends into the internal compartment 214. However, in other embodiments the cartridge may not define an internal compartment. For example, the cartridge 200C illustrated in FIG. 9 does not include an internal compartment. In this regard, the substrate 210C may comprise a sufficient quantity of the aerosol precursor composition, such that usage of an internal compartment may not be need in some embodiments. Thus, for example, the induction receiver 202 and the substrate 210C may be substantially coextensive, such that the longitudinal ends thereof terminate at substantially the same points. In this regard, the substrate induction receiver 202 and/or the substrate 210C may be received in a pocket 222C defined by the outer body 204C or otherwise engaged (e.g., directly engaged) with the outer body. Thus, in some embodiments the cartridge 200C may define a relatively simple configuration that may not include a container, a sealing member, or an internal compartment. Such a configuration may reduce the complexity and/or cost of the container 200C.

As described above, in some embodiments the substrate 210C may not extend into an internal compartment and may instead terminate, for example, proximate the outer body 204C. As further described above with respect to FIG. 9, in one embodiment the cartridge 200C may not include a container or an internal compartment. However, as illustrated in FIG. 10, in another embodiment the cartridge 200D may include the container 206D defining the internal compartment 214 without the substrate 210D extending into the compartment. In this regard, the induction receiver 202 and the substrate 210D may be engaged with the container or the outer body. For example, in FIG. 10 the induction receiver 202 and the substrate 210D are each engaged with the container 206D. By way of further example, as described above, the induction receiver 202 may be partially embedded in the container 206D. Further, the substrate 210D may engage a pocket 222D defined by the container 206D.

By configuring the cartridge 200D such that the substrate 210D does not extend into the internal compartment 214, the compartment may be employed for purposes other than a reservoir for the aerosol precursor composition. For example, as illustrated in FIG. 10, in some embodiments the cartridge 200D may include an electronic control component 224D. As described below, the electronic control component 224D may be employed in authentication of the cartridge 200D or employed for other purposes.

As noted above, each of the cartridges 200 of the present disclosure is configured to operate in conjunction with the control body 300 to produce an aerosol. By way of example, FIG. 11 illustrates the cartridge 200A engaged with the control body 300. As illustrated, when the control body 300 is engaged with the cartridge 200A, the induction transmitter 302A may at least partially surround, preferably substantially surround, and more preferably fully surround the induction receiver 202 (e.g., by extending around the circumference thereof). Further, the induction transmitter 302A may extend along at least a portion of the longitudinal length of the induction receiver 202, and preferably extend along a majority of the longitudinal length of the induction receiver, and most preferably extend along substantially all of the longitudinal length of the induction receiver.

Accordingly, the induction receiver 202 may be positioned inside of the inner chamber 324 about which the induction transmitter 302A extends. Accordingly, when a user draws on the mouthpiece 212 of the cartridge 200A, the pressure sensor 310 may detect the draw. Thereby, the controller 312 may direct current from the electrical power source 316 (see, e.g., FIG. 3) to the induction transmitter 302A. The induction transmitter 302A may thereby produce an oscillating magnetic field. As a result of the induction receiver 202 being received in the inner chamber 324, the induction receiver may be exposed to the oscillating magnetic field produced by the induction transmitter 302A.

In particular, the induction transmitter 302A and the induction receiver 202 may form an electrical transformer. A change in current in the induction transmitter 302A, as directed thereto from the electrical power source 316 (see, e.g., FIG. 3) by the controller 312, may produce an alternating electromagnetic field that penetrates the induction receiver 202, thereby generating electrical eddy currents within the induction receiver. The alternating electromagnetic field may be produced by directing alternating current to the induction transmitter 302. As noted above, in some embodiments the controller 312 may include an inverter or inverter circuit configured to transform direct current provided by the electrical power source 316 to alternating current that is provided to the induction transmitter 302A.

The eddy currents flowing the material defining the induction receiver 202 may heat the induction receiver through the Joule effect, wherein the amount of heat produced is proportional to the square of the electrical current times the electrical resistance of the material of the induction receiver. In embodiments of the induction receiver 202 comprising magnetic materials, heat may also be generated by magnetic hysteresis losses. Several factors contribute to the temperature rise of the induction receiver 202 including, but not limited to, proximity to the induction transmitter 302, distribution of the magnetic field, electrical resistivity of the material of the induction receiver, saturation flux density, skin effects or depth, hysteresis losses, magnetic susceptibility, magnetic permeability, and dipole moment of the material.

In this regard, both the induction receiver 202 and the induction transmitter 302A may comprise an electrically conductive material. By way of example, the induction transmitter 302 and/or the induction receiver 202 may comprise various conductive materials including metals such as cooper and aluminum, alloys of conductive materials (e.g., diamagnetic, paramagnetic, or ferromagnetic materials) or other materials such as a ceramic or glass with one or more conductive materials imbedded therein. In another embodiment the induction receiver may comprise conductive particles or objects of any of various sizes received in a reservoir filled with the aerosol precursor composition. In some embodiments the induction receiver may be coated with or otherwise include a thermally conductive passivation layer (e.g., a thin layer of glass), to prevent direct contact with the aerosol precursor composition.

Accordingly, the induction receiver 202 may be heated. The heat produced by the induction receiver 202 may heat the substrate 210 including the aerosol precursor composition, such that an aerosol 402 is produced. Accordingly, the induction receiver 202 may comprise an atomizer. By positioning the induction receiver 202 around the substrate 210 at a substantially uniform distance therefrom (e.g., by aligning the longitudinal axes of the substrate and the induction receiver), the substrate and the aerosol precursor composition may be substantially uniformly heated.

The aerosol 402 may travel around or through the induction receiver 202 and the induction transmitter 302A. For example, as illustrated, in one embodiment the induction receiver 202 may comprise a mesh, a screen, a helix, a braid, or other porous structure defining a plurality of apertures extending therethrough. In other embodiments the induction receiver may comprise a rod imbedded in a substrate or otherwise in contact with an aerosol precursor composition, a plurality of beads or particles imbedded in a substrate or otherwise in contact with an aerosol precursor composition, or a sintered structure. In each of these embodiments, the aerosol 402 may freely pass through the induction receiver 202 and/or the substrate to allow the aerosol to travel through the mouthpiece to the user.

The aerosol 402 may mix with air 404 entering through inlets 332, which may be defined in the control body 300 (e.g., in the outer body 304). Accordingly, an intermixed air and aerosol 406 may be directed to the user. For example, the intermixed air and aerosol 406 may be directed to the user through one or more through holes 226 defined in the outer body 204 of the cartridge 200A. In some embodiments the sealing member 208 may additionally include through holes 228 extending therethrough, which may align with the through holes 226 defined through the outer body 204. However, as may be understood, the flow pattern through the aerosol delivery device 100 may vary from the particular configuration described above in any of various manners without departing from the scope of the present disclosure.

As further noted above, in some embodiments the cartridge 200 may further comprise an electronic control component. For example, the cartridge 200D illustrated in FIG. 10 includes an electronic control component 224D. The electronic control component 224D may be configured to allow for authentication of the cartridge 200D. In this regard, in some embodiments the electronic control component 224D may be configured to output a code to the control body 300 which the controller 312 (see, e.g., FIG. 3) can analyze. Thereby, for example, the controller 312 may direct current to the induction transmitter 302 only when the cartridge 200D is verified as authentic. In some embodiments the electronic control component may include terminals that connect to the control body. More preferably, the electronic control component 224D may comprise a radio-frequency identification (RFID) chip configured to wirelessly transmit a code or other information to the control body 300. Thereby, the aerosol delivery device 100 may be used without requiring engagement of electrical connectors between the cartridge and the control body. Further, various examples of electronic control components and functions performed thereby are described in U.S. Pat. App. Pub. No. 2014/0096782 to Sears et al., which is incorporated herein by reference in its entirety.

As described above, the present disclosure relates to aerosol delivery device including a control body comprising a wireless power transmitter configured to receive an electrical current from an electrical power source and wirelessly heat an atomizer. As may be understood, various wireless heating techniques may be employed to heat an aerosol precursor composition, which may be contained in a reservoir and/or in contact with a substrate. In some embodiments the atomizer may be wirelessly heated without transmitting electrical current to the atomizer.

In the embodiments described above, the wireless power transmitter may comprise an induction transmitter and the atomizer may comprise an induction receiver. Thereby, eddy currents may be induced at the induction receiver in order to produce heat. As further noted above, the induction transmitter may be configured to at least partially surround the induction receiver. By way of further example, in other embodiments the atomizer may be wirelessly heated using radiant heating, sonic heating, photonic heating (e.g., via a laser), and/or microwave heating.

However, various other techniques and mechanisms may be employed in other embodiments to wirelessly heat an atomizer. For example, electrical current may be wirelessly transmitted to an atomizer, and such wireless power transmission techniques may be employed with any embodiment of atomizer such as wire coil resistive heating elements. Example embodiments of wireless power transmission methods and mechanisms are provided in U.S. patent application Ser. No. 14/814,866 to Sebastian et al., filed Jul. 31, 2015, which is incorporated herein by reference in its entirety.

Note that although the present disclosure generally describes heating a substrate comprising an aerosol precursor composition positioned in proximity to the induction receiver to produce an aerosol, in other embodiments the induction receiver may be configured to heat an aerosol precursor composition directed (e.g., dispensed) thereto. For example, U.S. patent application Ser. No. 14/309,282, filed Jun. 19, 2014; Ser. No. 14/524,778, filed Oct. 27, 2014; and Ser. No. 14/289,101, filed May 28, 2014, each to Brammer et al., disclose fluid aerosol precursor composition delivery mechanisms and methods, which are incorporated herein by reference in their entireties. Such fluid aerosol precursor composition delivery mechanisms and methods may be employed to direct an aerosol precursor composition from a reservoir to the induction receiver to produce an aerosol. In an additional embodiment the induction receiver may comprise a hollow needle connected to a reservoir, wherein capillary action directs the aerosol precursor composition into the needle to replenish the needle as the aerosol precursor composition is vaporized by the needle. Note further that while example shapes and configurations of the induction receiver and the induction transmitter are described herein, various other configurations and shapes may be employed.

A method for assembling an aerosol delivery device is also provided. As illustrated in FIG. 12, the method may include providing a substrate comprising an aerosol precursor composition at operation 502. The method may further include providing an induction receiver at operation 504. Additionally, the method may include positioning the substrate in proximity to the induction receiver at operation 506. The induction receiver may be configured to be exposed to an oscillating magnetic field to heat the aerosol precursor composition to produce an aerosol.

In some embodiments positioning the substrate in proximity to the induction receiver at operation 506 may comprise positioning the substrate in direct contact with the induction receiver. Further, positioning the substrate in proximity to the induction receiver at operation 506 may include positioning the substrate inside the induction receiver. The method may additionally include filling the substrate with the aerosol precursor composition. The aerosol precursor composition may comprise a liquid aerosol precursor composition.

The method may additionally include providing an induction transmitter and positioning the induction transmitter such that the induction transmitter at least partially surrounds the induction receiver. Positioning the induction transmitter may include positioning the induction transmitter out of direct contact with the induction receiver.

The method may additionally include forming a cartridge comprising the substrate and the induction receiver. Further, the method may include forming a control body comprising the induction transmitter. Positioning the induction transmitter such that the induction transmitter at least partially surrounds the induction receiver may include coupling the cartridge to the control body. Additionally, forming the control body may include coupling an electrical power source to the induction transmitter.

In an additional embodiment a method for aerosolization is provided. As illustrated in FIG. 13, the method may include providing a cartridge at operation 602. The cartridge may include an aerosol precursor composition and an atomizer. The method may additionally include providing a control body at operation 604. The control body may include an electrical power source and a wireless power transmitter. The method may further include directing current from electrical power source to the wireless power transmitter at operation 606. Additionally, the method may include wirelessly heating the atomizer with the wireless power transmitter to heat the aerosol precursor composition to produce an aerosol at operation 608.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. An aerosol delivery device, comprising:

an electrical power source;

an induction receiver configured to receive a substrate including an aerosol precursor composition such that the induction receiver is in proximity to the substrate; and a wireless power transmitter including an induction transmitter having a tubular configuration or a coiled configuration each defining an inner chamber, the induction transmitter being configured to removably receive the induction receiver within the inner chamber such that the induction transmitter surrounds the induction receiver received within the inner chamber, the induction transmitter configured to receive electrical current from the electrical power source that causes the induction transmitter to generate an oscillating magnetic field, and the induction receiver configured to generate heat via eddy currents induced at the induction receiver when exposed to the oscillating magnetic field and thereby heat the aerosol precursor composition to produce an aerosol.

2. The aerosol delivery device of claim 1, wherein the induction receiver is in contact with the substrate.

3. The aerosol delivery device of claim 2, wherein the aerosol precursor composition comprises a solid tobacco material or a semi-solid tobacco material.

4. The aerosol delivery device of claim 1, wherein the induction receiver is surrounding but out of direct contact with the substrate.

5. The aerosol delivery device of claim 1, wherein the induction transmitter is surrounding but out of direct contact with the induction receiver.

6. The aerosol delivery device of claim 1, comprising a pocket defined by a container or body of the aerosol delivery device or a component engaged with the container or body, the pocket being configured to receive the substrate.

7. The aerosol delivery device of claim 6, wherein the induction receiver is in proximity to or in contact with the substrate received by the pocket, and wherein the induction transmitter is configured to surround the pocket having the induction receiver and the substrate received therein.

8. The aerosol delivery device of claim 1, wherein the induction transmitter is removably attached to the aerosol delivery device.

9. The aerosol delivery device of claim 1, wherein the induction receiver is porous to allow the aerosol to freely pass through the induction receiver.

10. The aerosol delivery device of claim 9, wherein the induction receiver is a mesh, a screen, a helix or a braid.

11. The aerosol delivery device of claim 1, comprising a control body including the electrical power source and the induction transmitter, and a cartridge including the induction receiver and the substrate.

12. The aerosol delivery device of claim 11, wherein the control body further comprises an outer body, a controller, a flow sensor, and an indicator.

13. The aerosol delivery device of claim 1, wherein the aerosol precursor composition includes a solid tobacco material or a semi-solid tobacco material.

14. The aerosol delivery device of claim 1, wherein the aerosol precursor composition includes a liquid aerosol precursor composition.

15. The aerosol delivery device of claim 14, further comprising a container and a sealing member that define an internal compartment for the liquid aerosol precursor composition, the container defining a pocket configured to receive the substrate, and the sealing member defining an aperture through which the substrate is extended to receive the liquid aerosol precursor composition from the internal compartment.

16. A method for assembling an aerosol delivery device, comprising:

providing an induction receiver configured to receive a substrate including an aerosol precursor composition such that the induction receiver is in proximity to the substrate;

providing a wireless power transmitter including an induction transmitter having a tubular configuration or a coiled configuration each defining an inner chamber, the induction transmitter being configured to removably receive the induction receiver within the inner chamber; and positioning the induction transmitter such that the induction transmitter surrounds the induction receiver received within the inner chamber, the induction transmitter configured to receive electrical current from an electrical power source that causes the induction transmitter to generate an oscillating magnetic field, and the induction receiver configured to generate heat via eddy currents induced at the induction receiver when exposed to the oscillating magnetic field and thereby heat the aerosol precursor composition to produce an aerosol.

17. The method of claim 16, wherein providing the induction receiver comprises providing the induction receiver configured to receive the substrate such that the induction receiver is in contact with the substrate.

18. The method of claim 17, wherein providing the induction receiver comprises providing the induction receiver configured to receive the substrate with the aerosol precursor composition of the substrate comprising a solid tobacco material or a semi-solid tobacco material.

19. The method of claim 16, wherein providing the induction receiver comprises providing the induction receiver configured to receive the substrate such that the induction receiver surrounds but is out of direct contact with the substrate.

20. The method of claim 16, wherein providing the wireless power transmitter comprises providing the wireless power transmitter configured such that the induction transmitter removably receiving the induction receiver surrounds but is out of direct contact with the induction receiver.

21. The method of claim 16, comprising providing a pocket defined by a container or body of the aerosol delivery device or a component engaged with the container or body, the pocket being configured to receive the substrate.

22. The method of claim 21, wherein providing the induction receiver comprises providing the induction receiver in proximity to or in contact with the substrate received by the pocket, and wherein providing the wireless power transmitter comprises providing the wireless power transmitter such that the induction transmitter surrounds the pocket having the induction receiver and the substrate therein.

23. The method of claim 16, wherein the induction transmitter is positioned surrounding but out of direct contact with the induction receiver to thereby assemble the aerosol delivery device in which the induction transmitter is removably attached to the aerosol delivery device.

24. The method of claim 16, wherein providing the induction receiver includes providing the induction receiver that is porous to allow the aerosol to freely pass through the induction receiver.

25. The method of claim 24, wherein providing the induction receiver includes providing the induction receiver that is a mesh, a screen, a helix or a braid.

26. The method of claim 16, comprising positioning the substrate inside the induction receiver.

27. The method of claim 26, wherein positioning the substrate includes positioning the substrate in which the aerosol precursor composition includes a solid tobacco material or a semi-solid tobacco material.

28. The method of claim 26, wherein positioning the substrate includes positioning the substrate in which the aerosol precursor composition includes a liquid aerosol precursor composition.

29. The method of claim 28, comprising:

providing a container and a sealing member that define an internal compartment for the liquid aerosol precursor composition, the container defining a pocket in which the substrate is received;

filling the internal compartment with the liquid aerosol precursor composition; and extending the substrate through an aperture defined through the sealing member to receive the liquid aerosol precursor composition from the internal compartment.

30. The method of claim 16, comprising forming a cartridge including the substrate and the induction receiver.

31. The method of claim 16, comprising forming a control body including coupling the electrical power source to the induction transmitter.

32. An aerosol delivery device, comprising:

an electrical power source;

an induction receiver configured to receive a substrate including an aerosol precursor composition such that the induction receiver is in proximity to the substrate;

a wireless power transmitter including an induction transmitter, the induction transmitter being configured to removably receive the induction receiver such that the induction transmitter surrounds the induction receiver, the induction transmitter configured to receive electrical current from the electrical power source that causes the induction transmitter to generate an oscillating magnetic field, and the induction receiver configured to generate heat via eddy currents induced at the induction receiver when exposed to the oscillating magnetic field and thereby heat the aerosol precursor composition to produce an aerosol; and a pocket defined by a container or body of the aerosol delivery device or a component engaged with the container or body, the pocket being configured to receive the substrate, wherein the induction receiver is in proximity to or in contact with the substrate received by the pocket, and wherein the induction transmitter is configured to surround the pocket having the induction receiver and the substrate received therein.

33. A method for assembling an aerosol delivery device, comprising:

providing an induction receiver configured to receive a substrate including an aerosol precursor composition such that the induction receiver is in proximity to the substrate;

providing a wireless power transmitter including an induction transmitter configured to removably receive the induction receiver;

positioning the induction transmitter such that the induction transmitter surrounds the induction receiver, the induction transmitter configured to receive electrical current from an electrical power source that causes the induction transmitter to generate an oscillating magnetic field, and the induction receiver configured to generate heat via eddy currents induced at the induction receiver when exposed to the oscillating magnetic field and thereby heat the aerosol precursor composition to produce an aerosol; and providing a pocket defined by a container or body of the aerosol delivery device or a component engaged with the container or body, the pocket being configured to receive the substrate, wherein providing the induction receiver comprises providing the induction receiver in proximity to or in contact with the substrate received by the pocket, and wherein providing the wireless power transmitter comprises providing the wireless power transmitter such that the induction transmitter surrounds the pocket having the induction receiver and the substrate therein.

34. A method for assembling an aerosol delivery device, comprising:

providing an induction receiver configured to receive a substrate including an aerosol precursor composition such that the induction receiver is in proximity to the substrate;

providing a wireless power transmitter including an induction transmitter configured to removably receive the induction receiver;

positioning the induction transmitter such that the induction transmitter surrounds the induction receiver, the induction transmitter configured to receive electrical current from an electrical power source that causes the induction transmitter to generate an oscillating magnetic field, and the induction receiver configured to generate heat via eddy currents induced at the induction receiver when exposed to the oscillating magnetic field and thereby heat the aerosol precursor composition to produce an aerosol;

positioning the substrate inside the induction receiver, including positioning the substrate in which the aerosol precursor composition includes a liquid aerosol precursor composition;

providing a container and a sealing member that define an internal compartment for the liquid aerosol precursor composition, the container defining a pocket in which the substrate is received;

filling the internal compartment with the liquid aerosol precursor composition; and extending the substrate through an aperture defined through the sealing member to receive the liquid aerosol precursor composition from the internal compartment.

* * * * *